United States Patent [19]

Perkins et al.

[11] Patent Number: 5,458,823
[45] Date of Patent: Oct. 17, 1995

[54] METHOD AND APPARATUS FOR SPINNING FEEDSTOCK MATERIAL

[75] Inventors: James H. Perkins, Boyce; William F. Rutkowski; Michael L. Love, both of Arlington; Garry L. Myers, Reston, all of Va.

[73] Assignee: Fuisz Technologies Ltd., Chantilly, Va.

[21] Appl. No.: 330,938

[22] Filed: Oct. 28, 1994

[51] Int. Cl.⁶ .................................................... B29C 67/00
[52] U.S. Cl. ................................. 264/8; 425/8; 425/9
[58] Field of Search .................... 264/8, 211.1; 425/8, 425/9

[56] References Cited

U.S. PATENT DOCUMENTS

| | | |
|---|---|---|
| 796,528 | 8/1905 | Pollock . |
| 816,055 | 3/1906 | Zoeller . |
| 816,114 | 3/1906 | Morrison . |
| 847,365 | 3/1907 | Pollock . |
| 856,424 | 6/1907 | Robinson . |
| 1,489,342 | 4/1924 | Brent . |
| 1,541,378 | 6/1925 | Parcell . |
| 3,019,745 | 2/1962 | Du Bois et al. . |
| 3,036,532 | 5/1962 | Bowe . |
| 3,067,743 | 12/1962 | Merton et al. . |
| 3,070,045 | 12/1962 | Bowe . |
| 3,073,262 | 1/1963 | Bowe . |
| 3,095,258 | 6/1963 | Scott . |
| 3,118,396 | 1/1964 | Brown et al. . |
| 3,118,397 | 1/1964 | Brown et al. . |
| 3,125,967 | 3/1964 | Bowe . |
| 3,131,428 | 5/1964 | Mika . |
| 3,308,221 | 3/1967 | Opfell . |
| 3,324,061 | 6/1967 | Tanquary et al. . |
| 3,557,717 | 1/1971 | Chivers . |
| 3,723,134 | 3/1973 | Chivers . |
| 3,762,846 | 10/1973 | Chivers . |
| 3,856,443 | 12/1974 | Salvi . |
| 3,902,351 | 9/1975 | Kreps . |
| 3,925,525 | 12/1975 | LaNieve . |
| 3,930,043 | 12/1975 | Warning et al. . |
| 4,293,292 | 10/1981 | Israel . |
| 4,293,570 | 10/1981 | Vadasz . |
| 4,376,743 | 3/1983 | Dees . |
| 4,501,538 | 2/1985 | Bray et al. . |
| 4,526,525 | 7/1985 | Oiso et al. . |
| 4,793,782 | 12/1988 | Sullivan . |
| 4,846,643 | 7/1989 | Yamamoto et al. . |
| 4,872,821 | 10/1989 | Weiss . |
| 5,145,687 | 9/1992 | Parker ........................ 425/9 |
| 5,346,377 | 9/1994 | Bogue et al. . |

*Primary Examiner*—Mary Lynn Theisen
*Attorney, Agent, or Firm*—Hoffmann & Baron

[57] ABSTRACT

A spinner head is used in combination with a machine for processing and spinning feedstock material. The spinner head includes a base and a cover spaced from the base. A plurality of discrete closely spaced elongate heating elements are positioned between the base and the cover forming a barrier through which the feedstock material may be processed. The heating elements may be individually heated to a temperature sufficient to process the feedstock material therein. The spinner head is rotated to expel the feedstock material through the spaces between the heating elements.

57 Claims, 17 Drawing Sheets

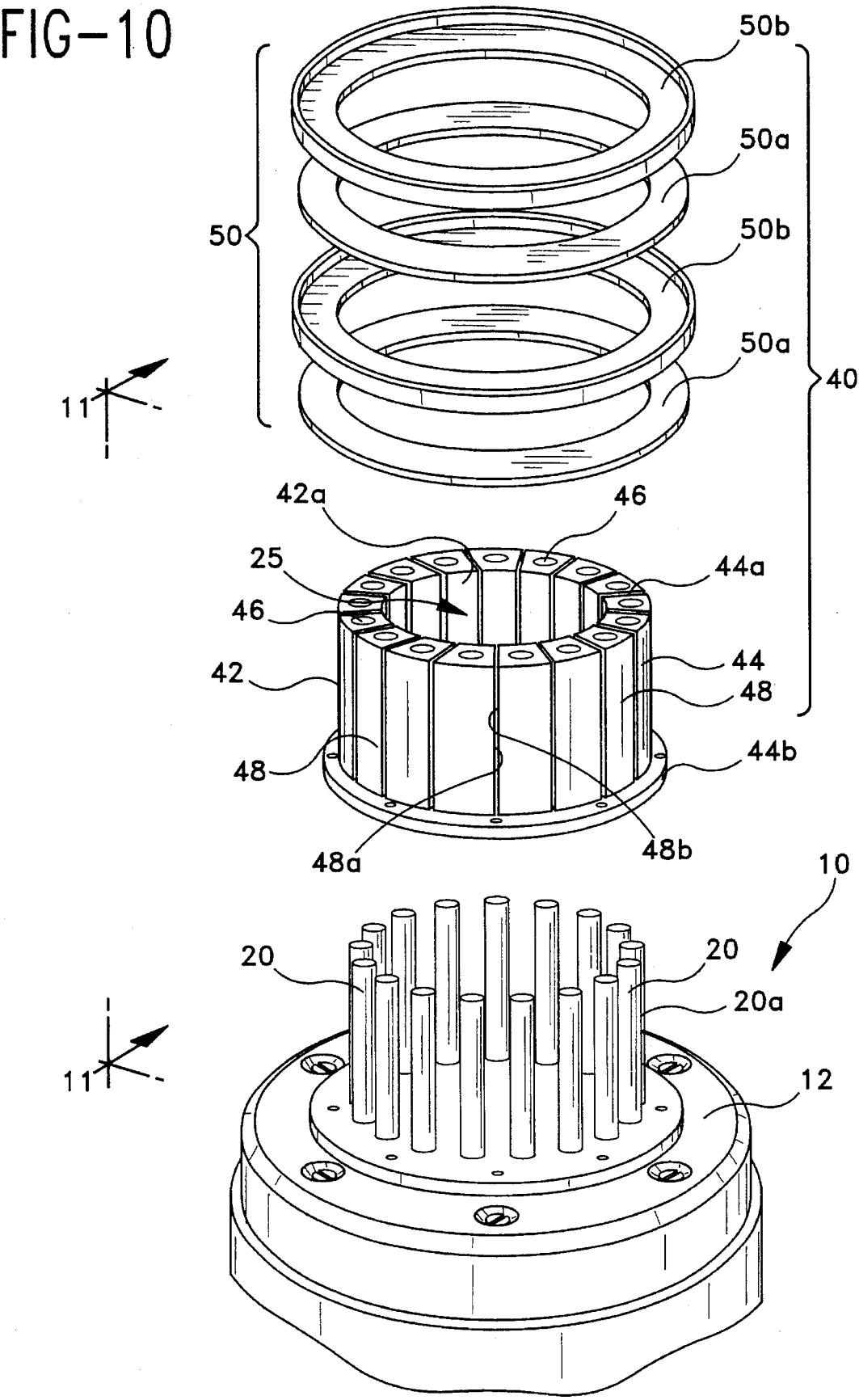

METHOD AND APPARATUS FOR SPINNING FEEDSTOCK MATERIAL

FIELD OF THE INVENTION

The present invention relates generally to a method and apparatus for heating and spinning feedstock materials. More particularly, the present invention relates to an improved method and apparatus for heating and spinning solid, non-solubilized feedstock material capable of undergoing intraparticle flow with the application of heat and force such as corn syrup solids, sucrose, polymers and the like where the heating of such materials is more accurately controlled so as to yield a spun product having desired morphology.

BACKGROUND OF THE INVENTION

Various machines have been devised for the melting and spinning of meltable materials, especially sugar. The meltable material may be introduced into a spinning head of the spinning machine in solid form. The material is melted therein just prior to being spun out from the spinner head where it solidifies in the air. The process of melt spinning sugar is most commonly seen in the manufacture of floss-like cotton candy.

Typical cotton candy spinning machines include a spinner head having a generally cylindrical apertured wall. Sugar in solid form, is introduced into the spinner head where it is melted. Spinning of the spinner head causes the melted sugar to be spun out through the apertures in the cylindrical wall where it solidifies into a floss-like structure which has become to be known as cotton candy. The characteristic shape and consistency of the spun material is influenced by several factors. These factors include the size and construction of the spinner head, the size, arrangement and location of the apertures in the cylindrical wall of the spinner head, as well as the manner in which heat is applied to the spinner head.

Numerous machines, designed specifically for spinning cotton candy, have employed various modifications of the spinner head construction in an effort to yield spun product.

U.S. Pat. No. 4,872,821 discloses a cotton candy spinning machine including a spinner head having stacked, slotted, cylindrical walls and coiled heating elements adjacent each wall. Sugar in solid form is introduced into the spinner head and propelled against the heating elements where it is melted. The molten sugar is spun out through the slots where it solidifies into the floss-like material known as cotton candy.

U.S. Pat. No. 3,930,043 discloses a machine which includes a helical resistance heating element positioned within a finely perforated shell. The heating element is supported against the inner wall of the shell by spacer elements. As the shell spins, molten sugar is extruded through the perforations. Similar machines are disclosed in U.S. Pat. Nos. 3,073,262 and 3,070,045.

U.S. Pat. No. 3,856,443 discloses another type of spinning machine wherein the perforated shell through which sugar is extruded functions as the resistance element of the heating means.

U.S. Pat. No. 1,541,378 discloses a spinning machine including a heating ribbon positioned within a helically wound wire. The heating ribbon melts the sugar, which then passes through the interstices thereof and then between the coils of the helically wound wire.

U.S. Pat. No. 1,489,342 discloses a spinner head having an annular heating element formed of a strip of electrical resistance material. The strip is bent as a flat spiral structure forming slanted stretches of heating element having narrow slots between them. The heating element melts the sugar which then passes through the slots between the stretches of the heating element and out through an apertured shell positioned thereabout. A similar machine is also shown in U.S. Pat. No. 816,055.

U.S. Pat. No. 816,114 also forms a heating element of closely arranged coils or folds of a ribbon type resistance heater. The heater is arranged in an annular configuration and placed against an outer spinner head shell which is formed of a plurality of closely spaced glass rods. The sugar is melted by the annular heating element and passes through the heating element and through the spaces between the glass rods.

While some of the above described machinery may perform satisfactorily for converting granular sugar into a floss-like material in the formation of cotton candy, it does not function entirely satisfactorily for spinning other materials which may have properties quite dissimilar to sugar or for other materials mixed with sugar. Nor does the above-described machinery have the capacity to yield product having a desired shape and size. In recent years, it has been increasingly desirable to spin not only feedstock such as sugar and materials combined with sugar, but also nonsaccharides.

One recently developed method of producing substances having pharmacological properties is disclosed in U.S. Pat. No. 4,855,326. This patent discloses combining sugar with a medicament and spinning the combination into a readily water-soluble floss or fiber. In U.S. Pat. No. 5,011,532, the disclosure concerns oleaginous substances such as vegetable oil, baby oil, margarine, lanolin, cocoa butter and the like, and how their lack of affinity for water is altered by mixing the oleaginous substance with sugar and melt-spinning the mixture in cotton candy spinning machines or the equivalent. As so modified, the products disperse in water forming a colloidal or pseudocolloidal dispersion.

Other disclosures which relate to floss-spinning substances with one or more sugars are found in U.S. Pat. No. 4,873,085, U.S. Pat. No. 5,034,421, U.S. Pat. No. 5,028,632 and U.S. Pat. No. 4,997,856. The products described in the above-mentioned patents are all produced by processing in a conventional cotton candy machine. Conventional machinery, however, may be unacceptable for spinning certain materials for certain uses. Conventional machinery also may not offer the user a choice in the size of the openings through which feedstock material is caused to pass prior to being spun out from the spinner head.

The disclosures of each the above-identified patents set forth herein are hereby incorporated by reference.

One attempt to eliminate undesirable drawbacks of conventional machinery especially with regard to the spinning of feedstock including non-sugars as well as sugars combined with non-sugars, is shown and described in commonly assigned co-pending U.S. patent application Ser. No. 08/192,133, filed on Feb. 4, 1994 and entitled "Method and Apparatus for Spinning Thermo-Flow Materials, which is also incorporated by reference herein. The spinner head described therein is referred to as a "cable head" spinner. The cylindrical wall of the spinner head is formed by a heating element comprising a cable which is helically wound about the axis of rotation of the spinner head. In this way the heating element itself is used as the wall of the spinner head through which the material is projected.

While the device shown and described in the above-identified application overcomes many of the disadvantages found in prior art devices, the heating of a helically wound cable may not provide adequate uniform heating necessary in certain applications. Continuously wound resistance-type heating elements may suffer significant heat loss away from the source of power. This may tend to result in non-uniform application of heat. It has been found that the uniform application of heat is one particularly significant factor in precisely controlling the morphology of the spun product.

In that regard a need clearly exists for spinning machinery which provides the user with the ability to process and spin different types of materials and to produce spun product having desired controlled morphology ranging from microsphere to floss.

OBJECTS AND SUMMARY OF THE INVENTION

It is an object of the present invention to provide an improved method an apparatus for flash flow processing and liquiflash processing of feedstock materials in a spinner head.

It is a further object of the present invention to provide a spinner head having precisely controlled apertures through which feedstock material may be expelled.

It is a still further object of the present invention to provide closely spaced heating elements through which feedstock material may be expelled.

It is yet another object of the present invention to provide a spinner head including a plurality of heating elements where selected ones of the heating elements may be individually heated to uniformly control the heat supplied to the spinner head.

The present invention provides a spinner head which includes a base and a cover positioned over the base. A plurality of discrete elongate heating elements extend between the base and the cover in spaced side-by-side configuration. The base, the cover and the heating elements define therein a chamber for accommodating and processing feedstock material. Selected ones of the heating elements are individually heated to an elevated temperature sufficient to permit processing of the feedstock material. The spinner head is rotated about an axis of rotation to cause the feedstock material to be propelled towards the heating elements which function as a control barrier and to be expelled between the spaces between the heating elements.

As a result of the present invention, thermal energy can be delivered efficiently and controllably to the barrier through which the feedstock must be passed in order to undergo processing. Heat can be provided at a high intensity by heating all or selected areas of the heating elements. Control over the amount of heat delivered can be effectively and carefully controlled by selection of the number and location of the heating elements which are energized.

In addition the size of the spaces between heating elements can be controlled to further control the processing of the feedstock material. Devices such as cylindrical sleeves or fins may be placed about the heating elements to reduce the spacing therebetween.

In a further embodiment of the present invention, a web of screen material may be interposed between the heating elements. The feedstock material may be spun through the web of screening material.

It is to be understood that the apparatus and method of the present invention can be employed to form particles which are microspheres of a very narrow size range or fibrous floss type material or particles of a shape somewhat in between these extremes. By careful control of conditions, the apparatus of the present invention can be utilized to form particles of a predetermined shape. Conditions which must be controlled include: the heat necessary to bring a feedstock to a melt flow condition, the viscosity of the molten feedstock; the centrifugal force necessary to move the molten feedstock to the resistance of an ambient atmosphere which will subdivide the feedstock into particles; the temperature and relative flow of the atmosphere into which the molten feedstock is delivered for subdivision; and the distance needed in relation to the ambient atmosphere so that the expelled feedstock particles can virtually resolidify in the desired shape.

One skilled in the art can select a material to be processed according to the present invention. Guided by the heat and centrifugal force necessary to bring the selected feedstock under liquiflash conditions, the appropriate size and shape of the exit orifices (usually slit shape) in relation to the ambient atmosphere can be selected so as to virtually yield microspheres, floss or particle shapes somewhere in between.

For further details concerning the materials employable in the apparatus and method of the present invention, attention is directed to U.S. patent application Ser. No. 08/330,412 filed of even date herewith and owned by the assignee of the instant application. This application is incorporated herein by reference in its entirety.

Other techniques are disclosed by way of further embodiments for controlling the expulsion of feedstock material from the spinner head.

BRIEF DESCRIPTION OF THE DRAWINGS

FIG. 10 shows in exploded perspective view, a modification of the spinner head of FIG. 1 including a multicomponent annular housing assembly positionable over the tubular heating elements.

Figure 11:
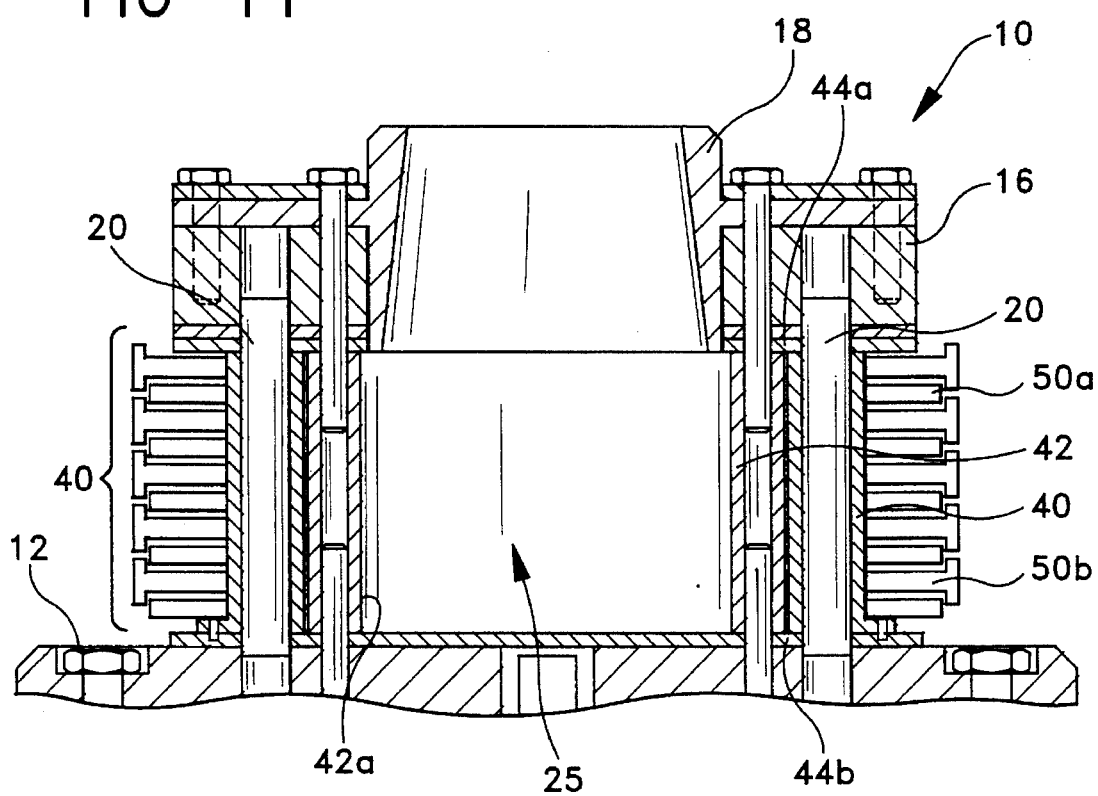
FIG. 11 is a sectional view of the assembly of FIG. 10 taken through the lines 11—11 thereof.
Figure 11A:
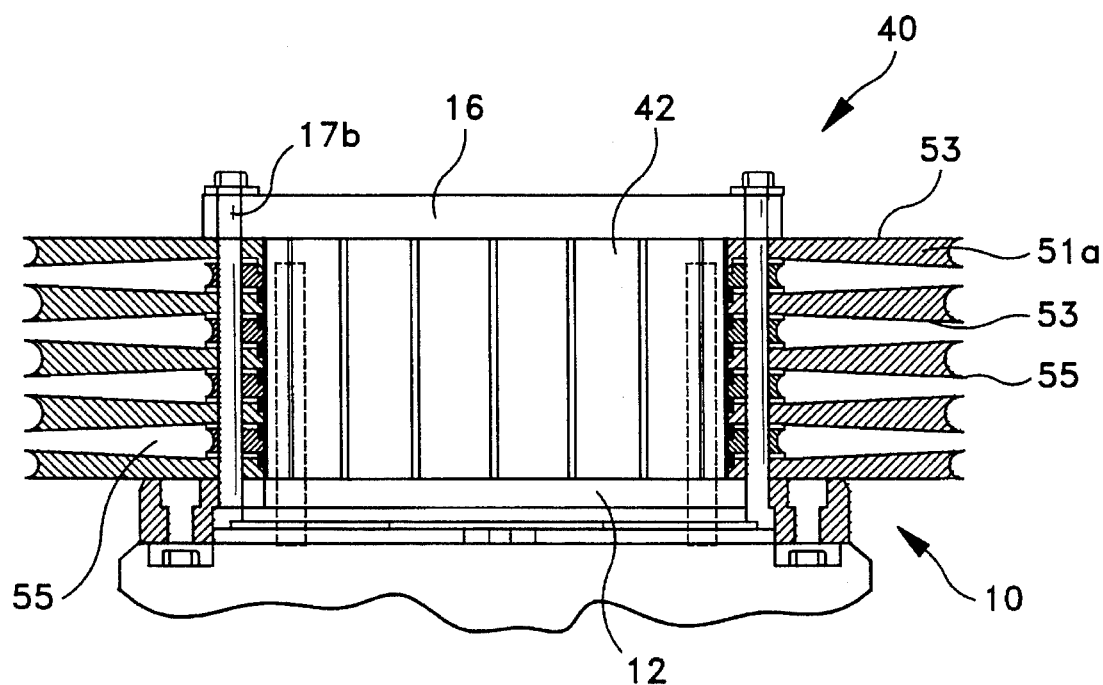

FIG. 11A shows a modification of the annular housing shown in FIG. 10.

Figure 11B:
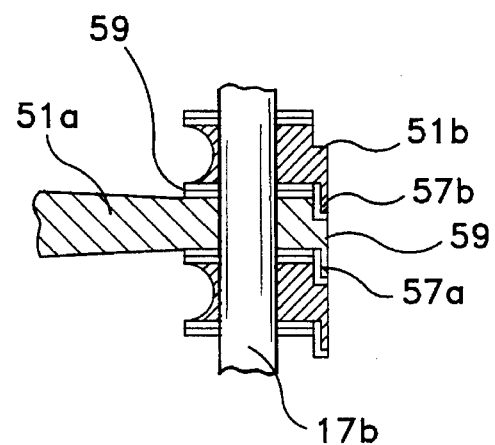

FIG. 11B is an enlarged sectional showing of a portion of the annular housing shown in FIG. 11A.

Figure 12:
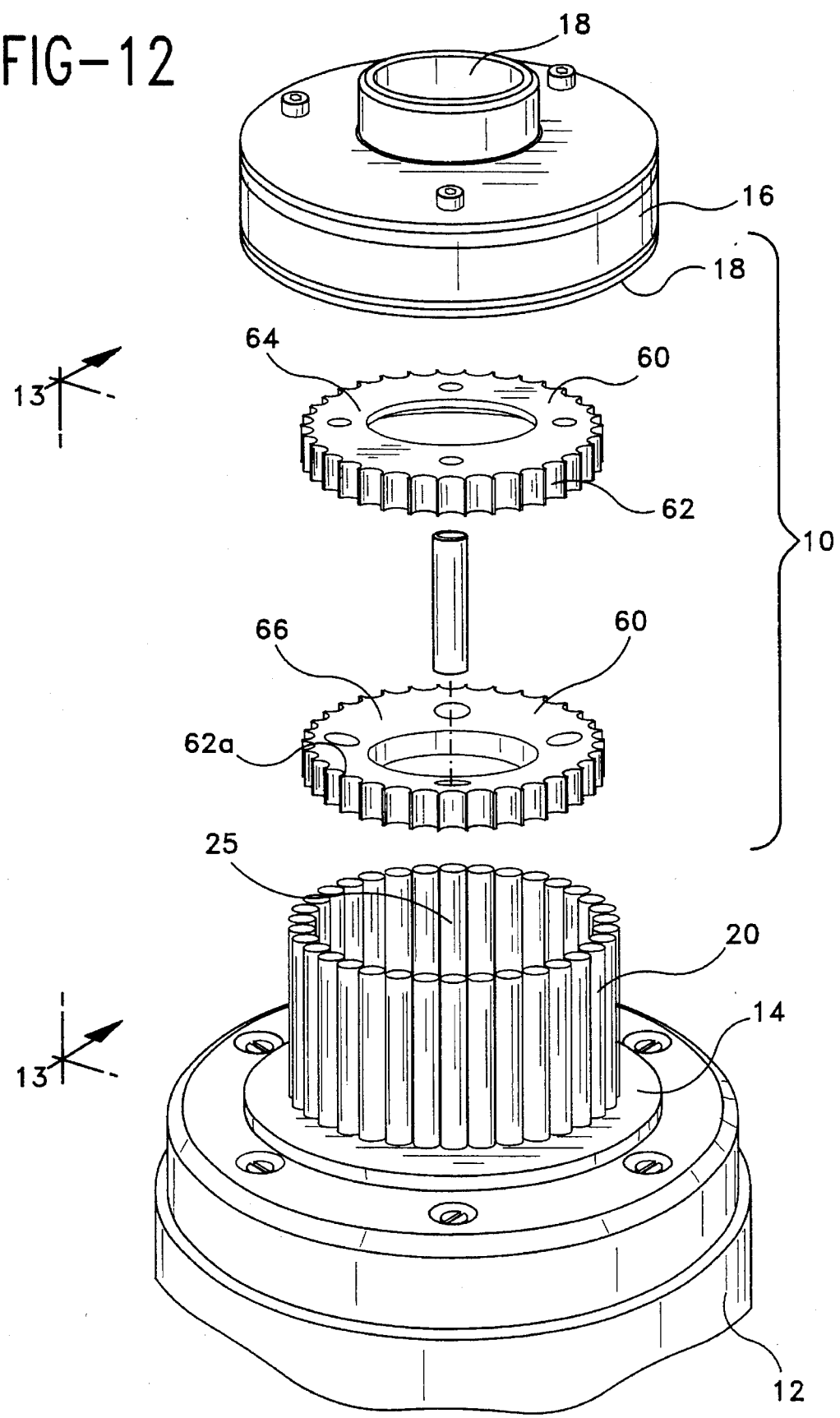

FIG. 12 is an exploded perspective view of a further embodiment of the spinner head of the present invention.

Figure 13:
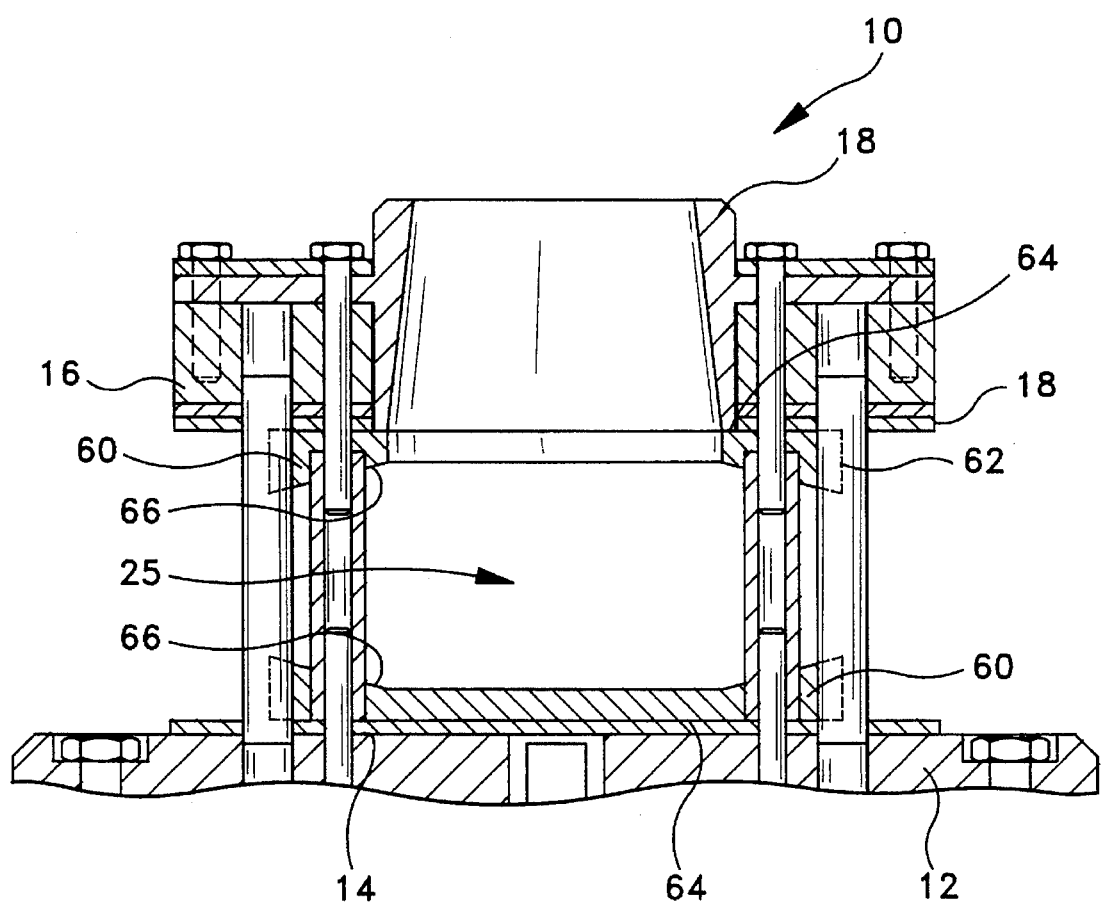

FIG. 13 is a sectional view of the embodiment of the spinner head of FIG. 12 taken through the lines 13—13 thereof.

Figure 14:
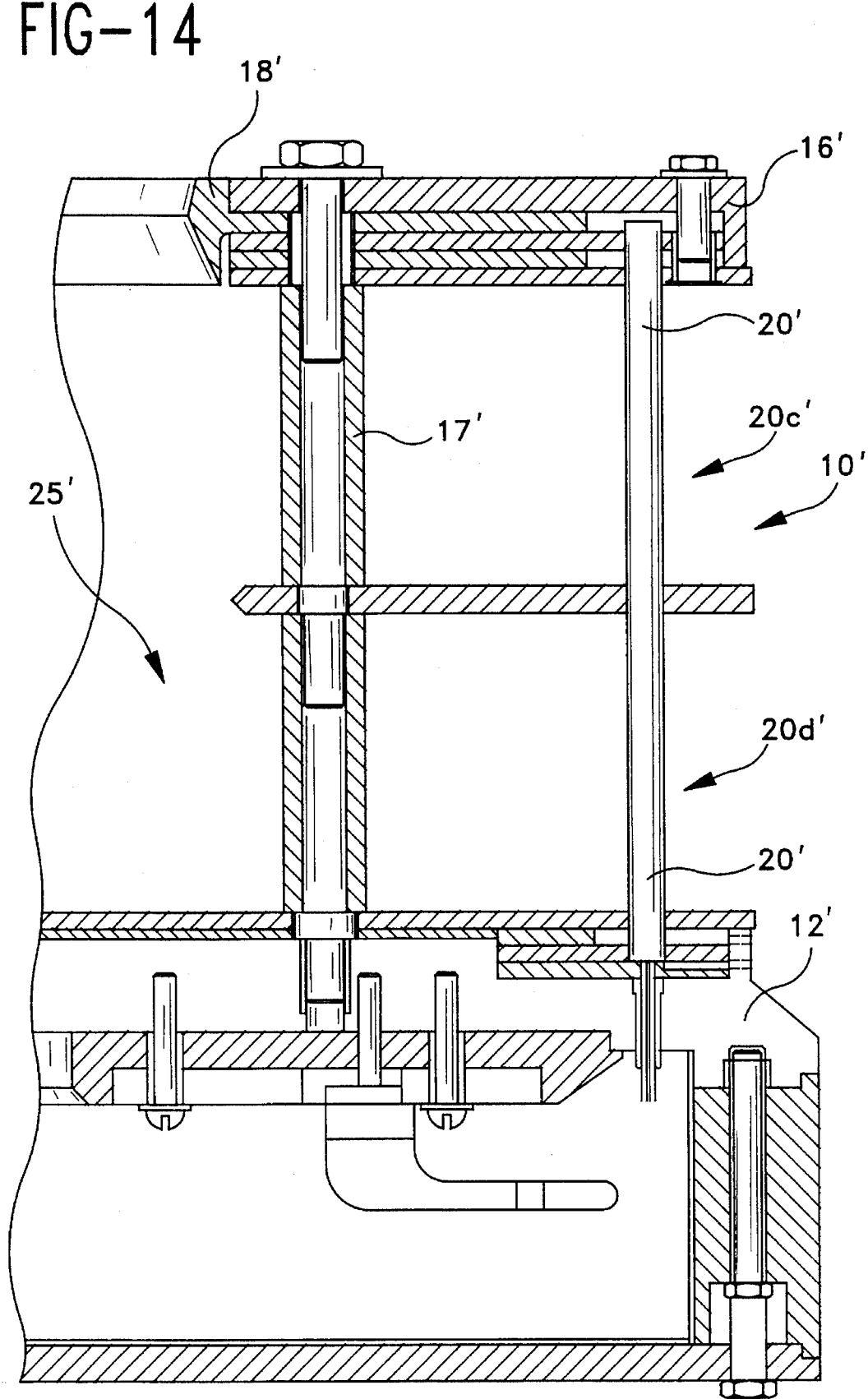

FIG. 14 is a partial sectional view of a further embodiment of the spinner head of the present invention.

Figure 15:
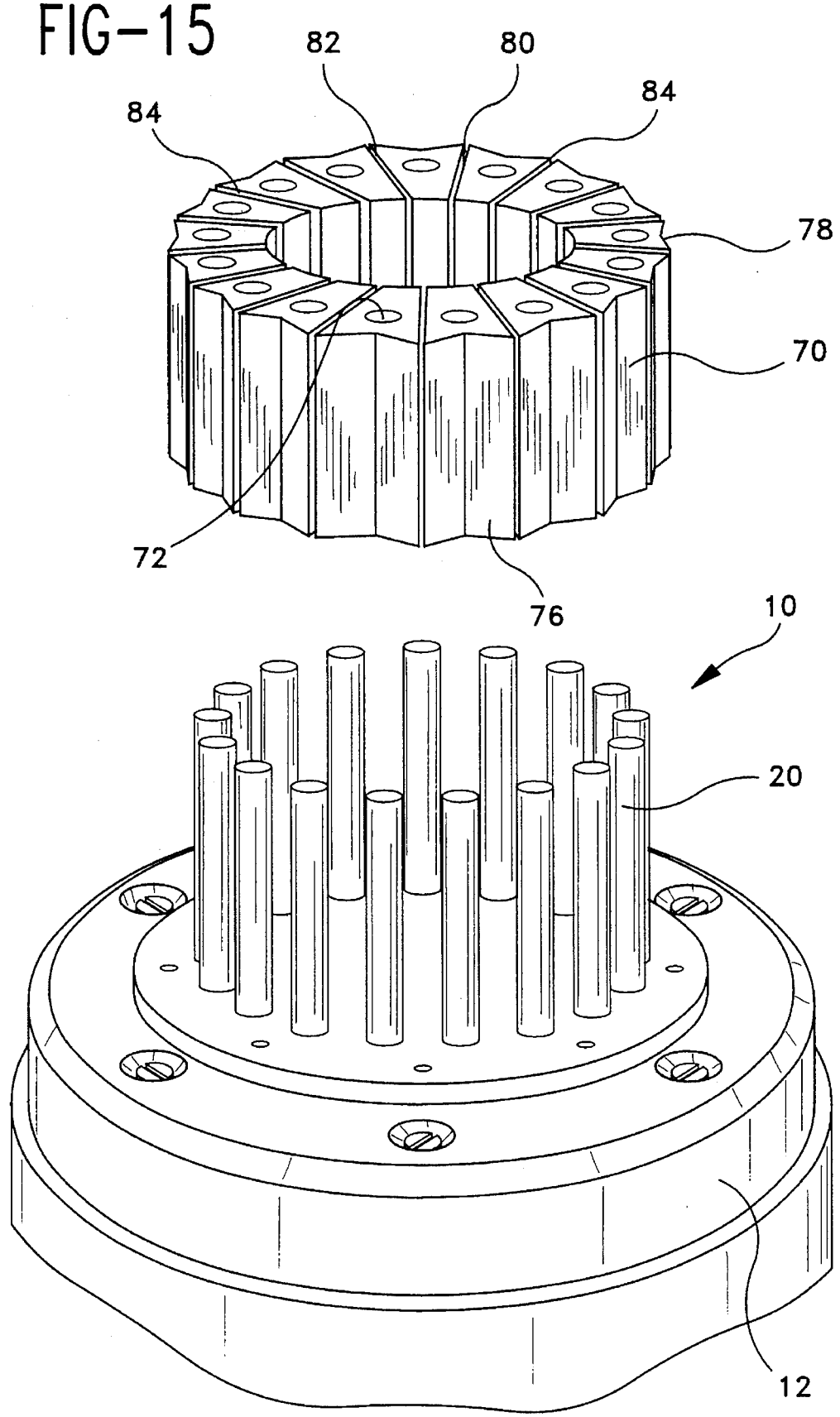

FIG. 15 is an exploded perspective showing of an additional embodiment of the spinner head of the present invention.

Figure 16:
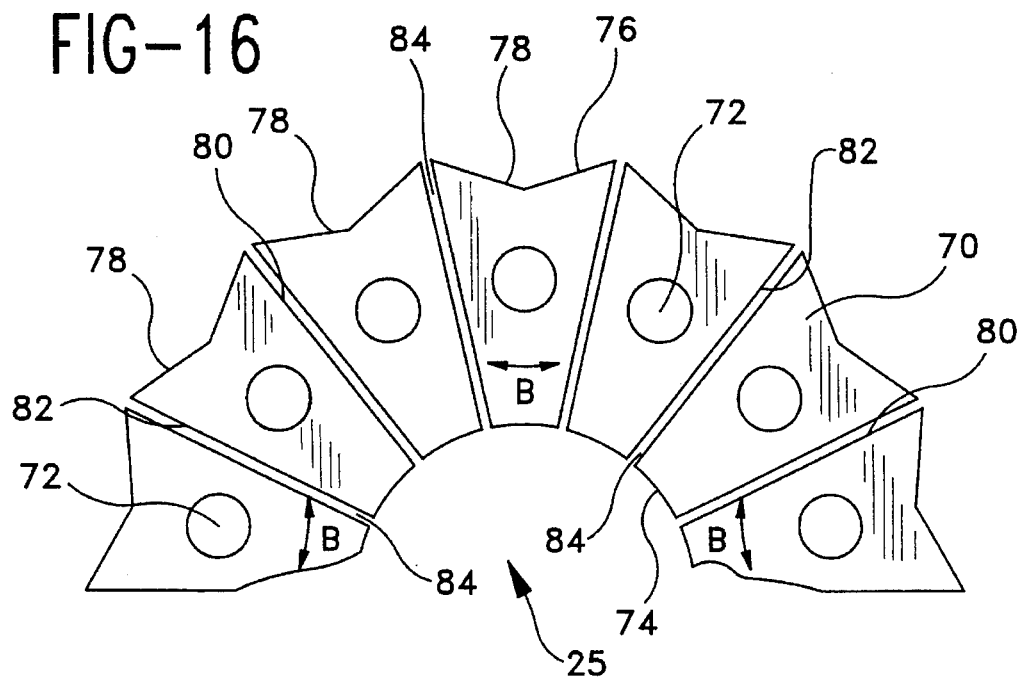

FIG. 16 is a top partial plan view of the spinner head of FIG. 15.

Figure 17:
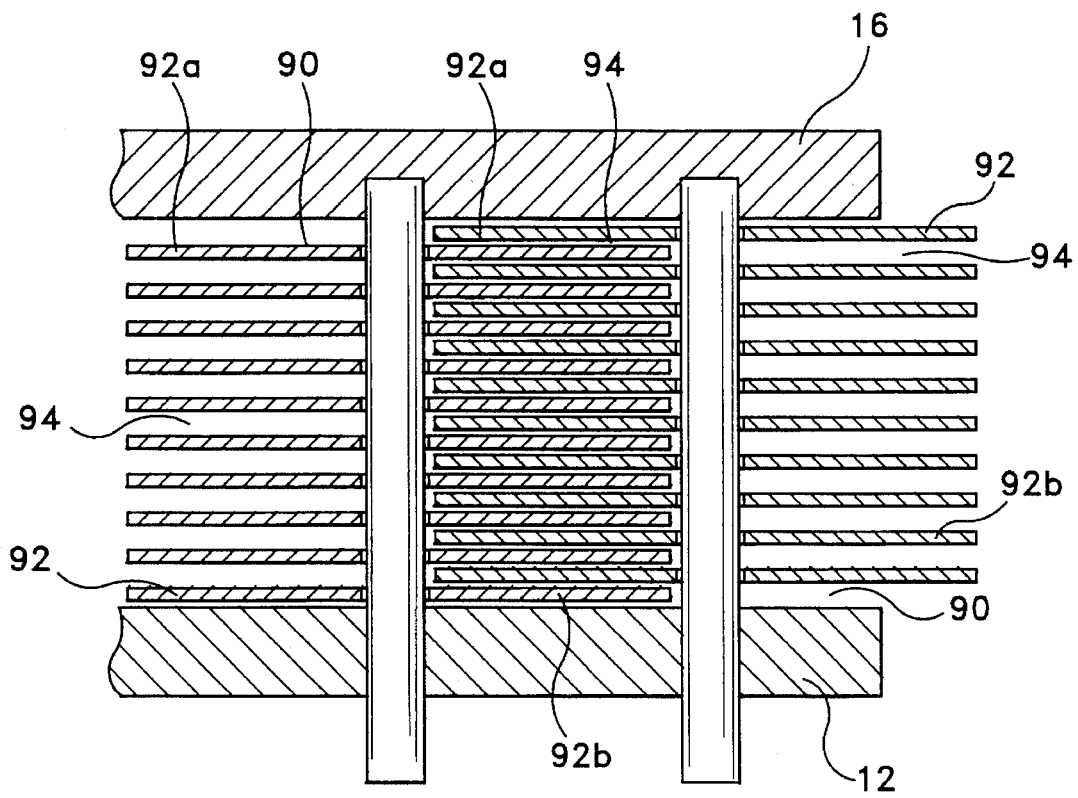

FIG. 17 is a sectional showing of a further embodiment of the spinner head of FIG. 15.

Figure 18:
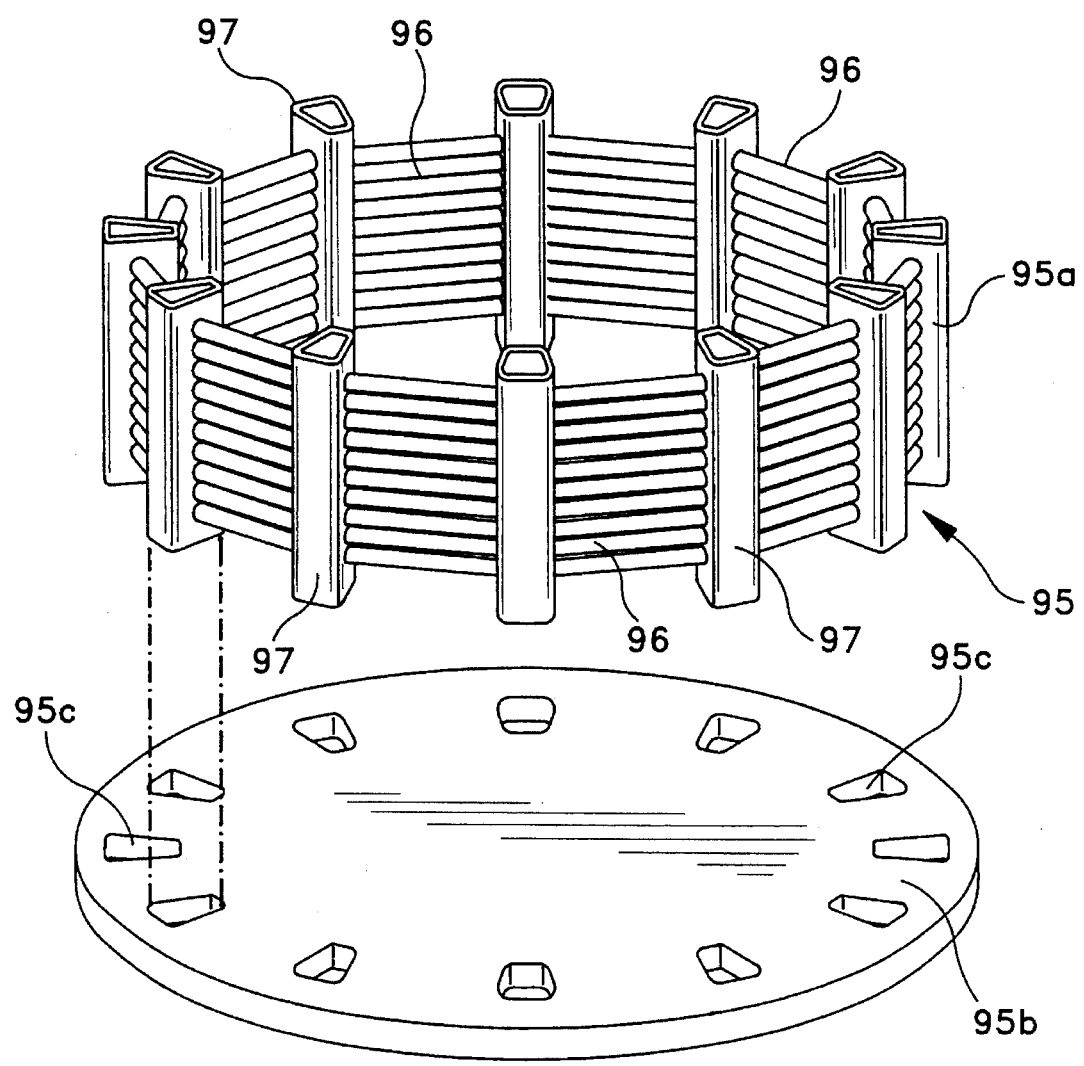

FIG. 18 is an exploded perspective showing of a portion of a still further embodiment of the spinner head of the present invention.

DETAILED DESCRIPTION OF THE PREFERRED EMBODIMENTS

The present invention contemplates subjecting solid, non-solubilized feedstock material (feedstock) which is capable of undergoing intraparticle flash flow processing or liqui-flash processing to a heat sufficient to cause the material to deform or liquify and pass through an opening under force. The force used in the present invention is centrifugal force provided by a spinner head from which the feedstock material is expelled at a high speed. Preferably no external force is imposed upon the feedstock material after it has been expelled from the spinner head other than resistance provided by ambient atmosphere. The feedstock material so expelled instantly reforms as a solid having a changed morphology as a result of the material being expelled from the spinner head.

The phenomena of the present invention occurs in a short amount of time, not more than one second and preferably on the order of tenths of a second. This phenomena can be produced by relatively high speed distribution of the feedstock to an environment of elevated temperature under constant force such as centrifugal force caused by the high speed rotation of the spinner head. As indicated above, the morphology of the reformed product can also be influenced by the size and shape of the openings through which the reformed product exits the spinner head. By controlling the amount of heat applied to the spinner head as well as the openings through which the melted product is expelled, the present invention provides the ability to control the morphology of the material expelled from the spinner head. For microsphere formation the particles must have sufficient free flight so that surface tension and temperature drop can form solid spheres.

Figure 1:
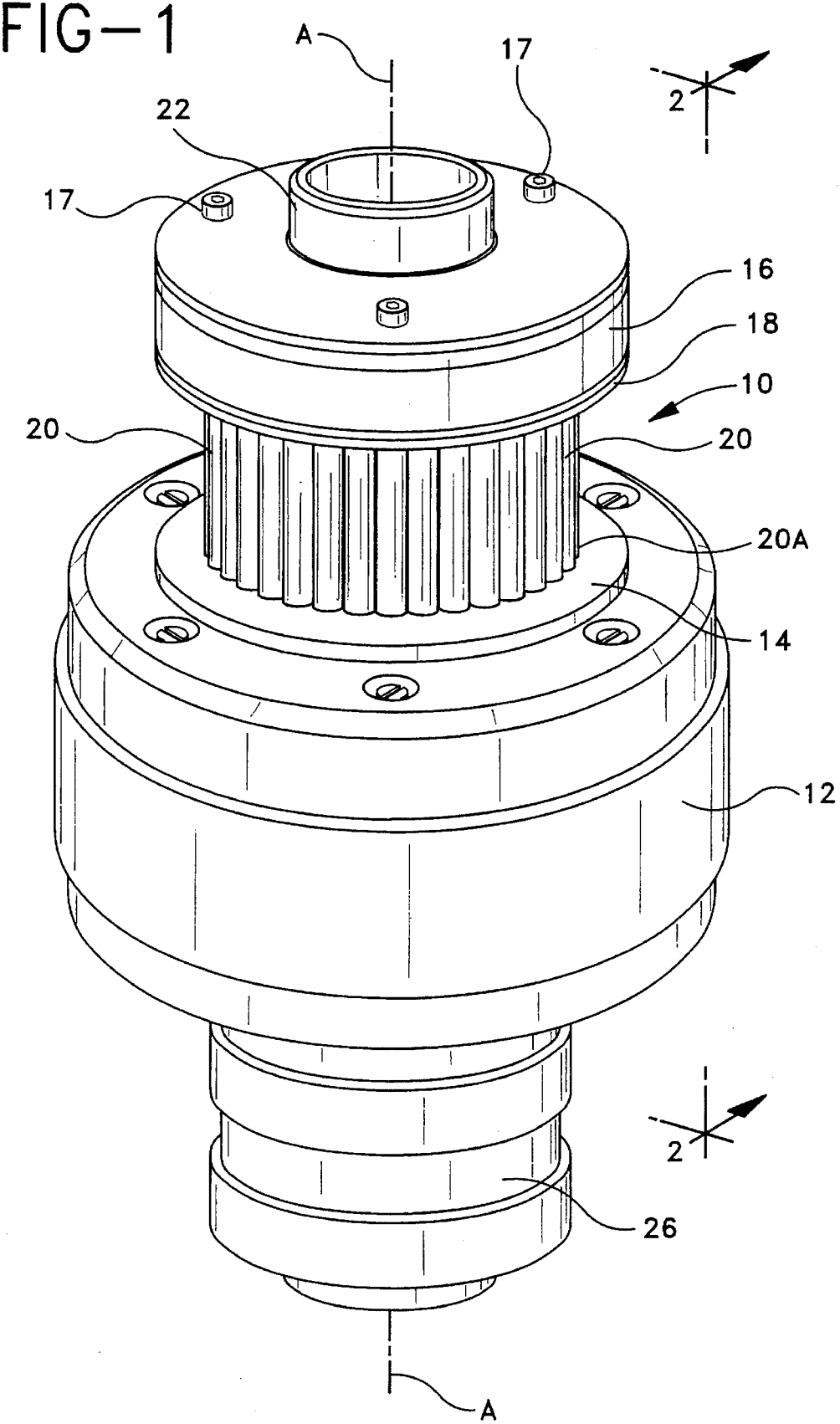
FIG. 1 is a perspective view of a spinner head of the present invention.
Figure 2:
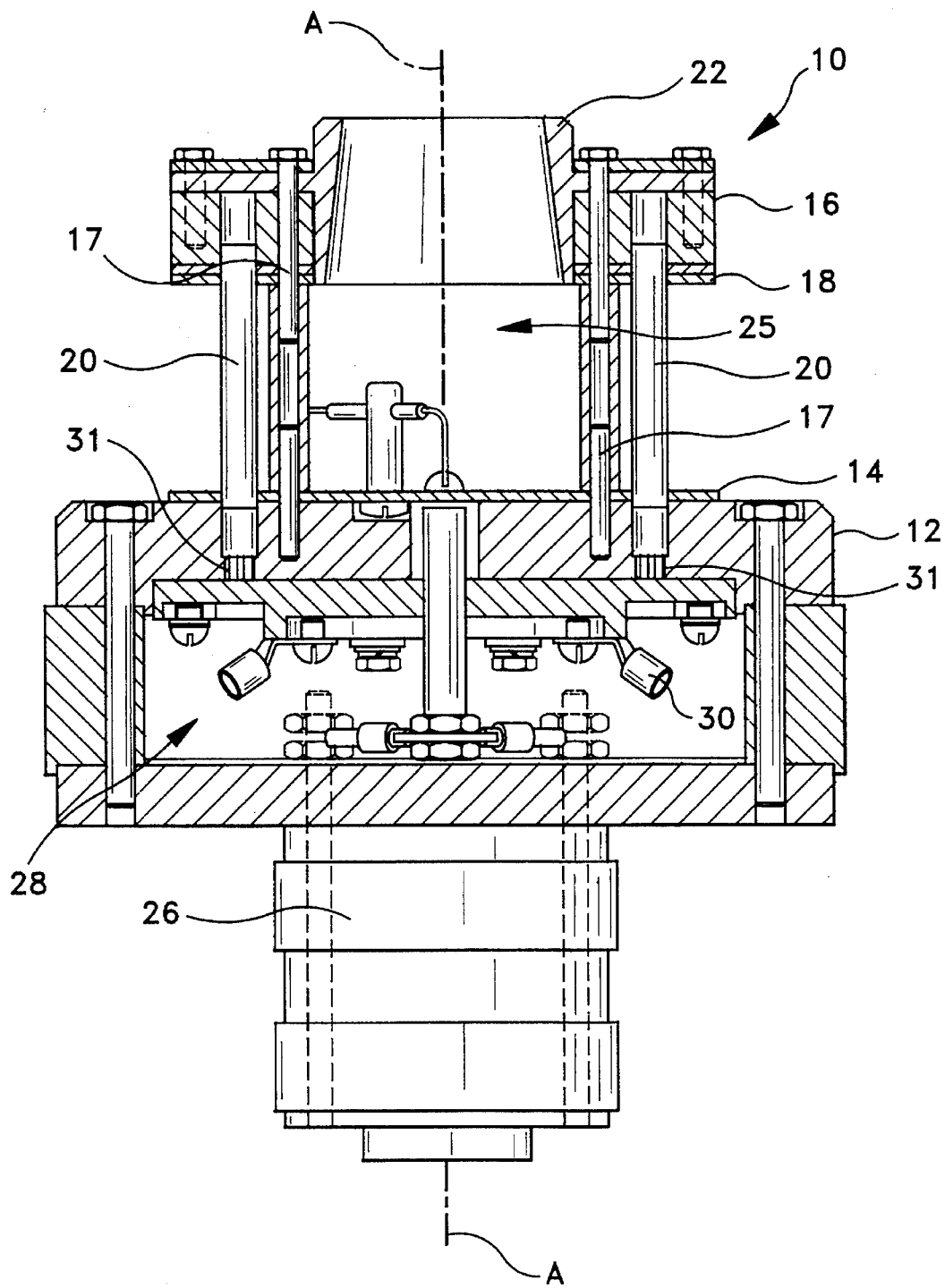
FIG. 2 is a sectional view of the spinner head of FIG. 1 taken through 2—2 thereof.

Referring now to the drawings, FIGS. 1 and 2 show a spinner head 10 of the present invention. Spinner head 10 may be used in a manner similar to conventional cotton candy machines to expel feedstock which has been processed in the spinner head into a collection basin or bin (not shown). Use of collection bins in combination with spinner heads to form floss-like cotton candy from sugar is well known in the art.

Spinner head 10 includes a generally cylindrical base 12 including a planar bottom insulating ring 14. Spaced above base 12 is a generally cylindrical cover 16 including a planar top insulating ring 18. Appropriate mechanical structure such as bolts 17 may be employed to support cover 16 in spaced relation over base 12. Base 12 and cover 16 may be formed from stainless steel or other suitable material. Insulating rings 14 and 18 are preferably formed from a heat insulative material such as a ceramic or a heat resistant polymer.

Extending between base 12 and cover 16 are a plurality of tubular heating elements 20 which are arranged in a generally circular array 20a about a central axis of rotation A. Base 12, cover 16 and tubular heating elements 20 form a chamber 25 for accommodating feedstock material therein. In order to insert the feedstock into the chamber 25 of spinner head 10, cover 16 includes a generally centrally located opening therethrough which supports a funnel 22 therein. A stem 26 extends centrally downwardly from base 12 and includes an appropriate mechanism (not shown) for permitting the rotation of the spinner head 10 about axis A in a manner which is well known in the art. Base 12 also houses an electrical interface assembly 28 therein which, as will be described in further detail hereinbelow, powers tubular heating elements 20.

Figure 4:
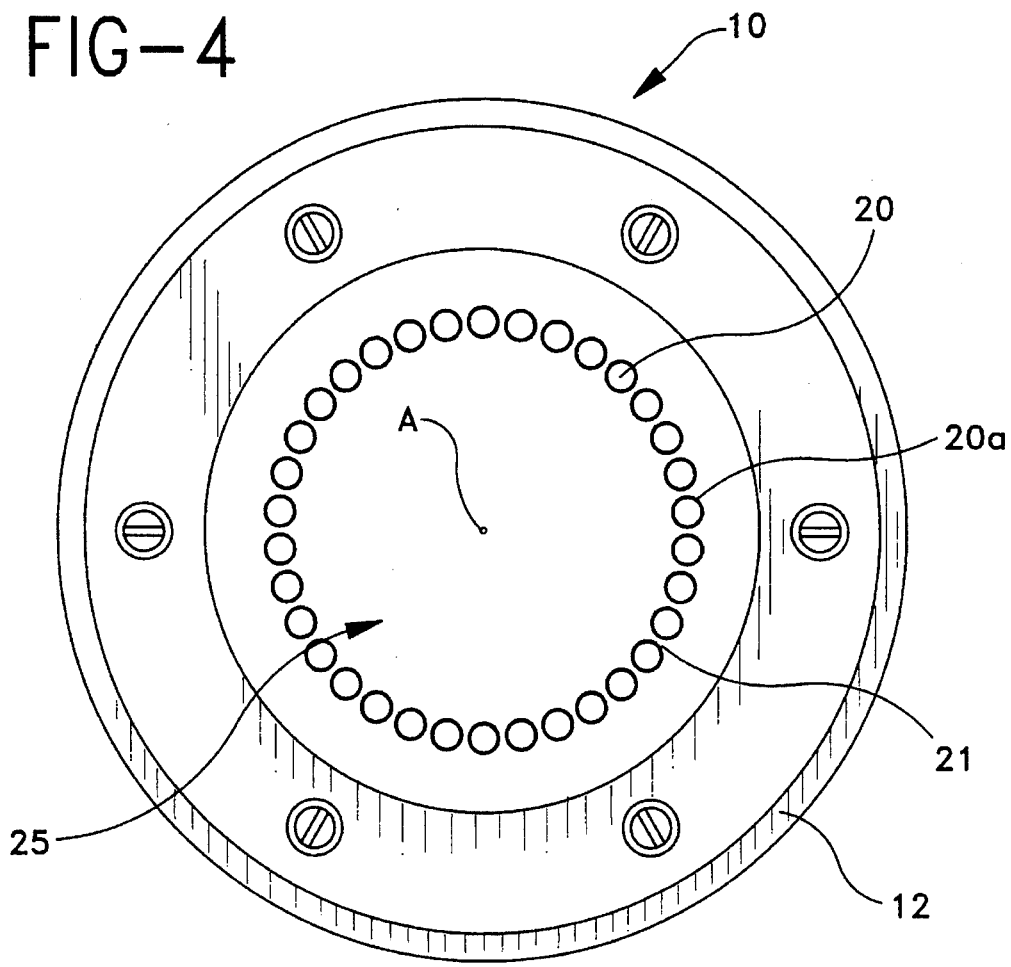
FIG. 4 is a top plan view of the spinner head of FIG. 1 with the top portion of the spinner head removed to reveal a circular array of spaced tubular heating elements.
Figure 5:
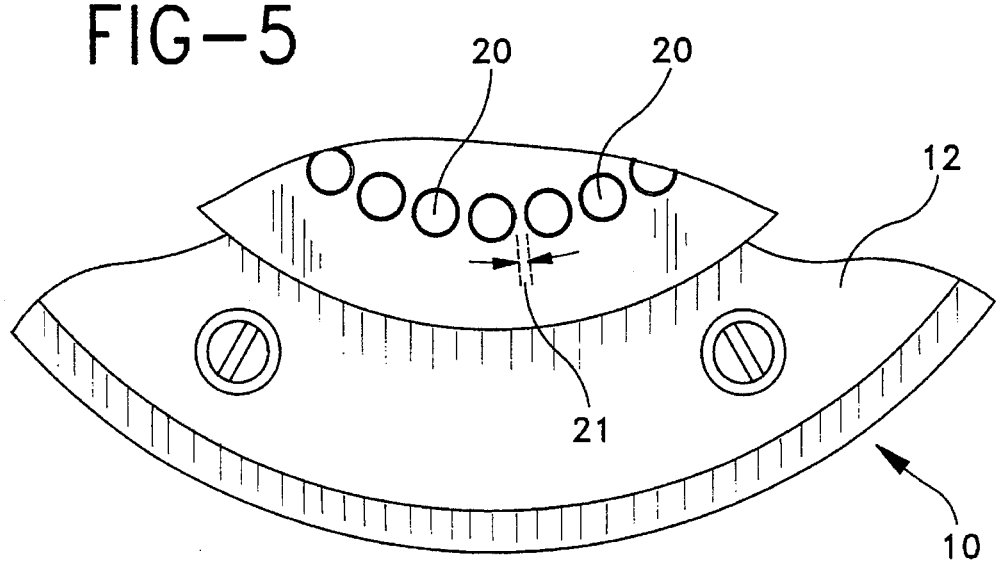
FIG. 5 is an enlarged partial top plan view of the spinner head shown in FIG. 4.

Referring additionally to FIGS. 4 and 5, tubular heating elements 20 are generally elongate hollow cylindrical members formed of high watt density heat conductive metal. In a preferred form, tubular heaters may be made from alloy steel tubes. The tubular heating elements 20 may also include a mineral insulated construction having high temperature withstanding capability. Tubular heating elements 20 are positioned in a closely spaced circular array 20a to define a cylindrical wall between base 12 and cover 16. In this manner the tubular heating elements may be used as tie or torsion columns to provide a head structure of unitized strong mass. Tubular heating elements 20 are preferably arranged vertically, that is, perpendicular to base 12 and cover 16, but the tubular heating elements may also be slightly canted. The tubular heating elements 20 may be inserted between cover 16 and base 12 in a force-fitted manner so as to maintain an interference fit under all operating conditions.

The spaces between the tubular heating elements 20 define openings 21 through which the feedstock is spun. Openings 21 are defined between adjacent tangent points of adjacent tubular heating elements 20. The size of openings 21 is selected in part to form flow dams which restrict the flow of feedstock from exiting spinner head 10. Whereas spinner heads of the prior art have included separate heaters for the purpose of heating perforated or apertured shells through which the feedstock is expelled, in the present invention the tubular heating elements 20 actually form the barrier through which the feedstock must pass through processing. Tubular heating elements 20 of the present invention are constructed not only to heat the material in the spinner head 10 but can also contribute to the ultimate shape of the product resulting from the process.

The present invention further provides for the controlled uniform application of heat within spinner head 10 by use of tubular heating elements 20. Many of the prior art spinner heads employ heating elements of electrical resistance type. A length of heater wire may be formed or coiled into a desired configuration to be employed in combination with the spinner head. However in many of these prior art designs, the heaters are powered from a single location, thus there is a tendency for the heater to lose heat away from the source of power. Such heat loss prevents uniform application of heat to the feedstock material spun in the spinner head. Further, the ability to provide a high degree of controlled heat is compromised by such designs. Underheating or overheating of the feedstock material within the spinner head caused by non-uniform application of heat, greatly reduces the uniformity and shape of the spun product. The present invention attempts to alleviate such deficiencies by providing individually powered heating elements 20 forming the wall of the spinner head through which the feedstock is processed and expelled. Heat is consequently supplied by the processing barrier more efficiently and predictably.

Figure 3:
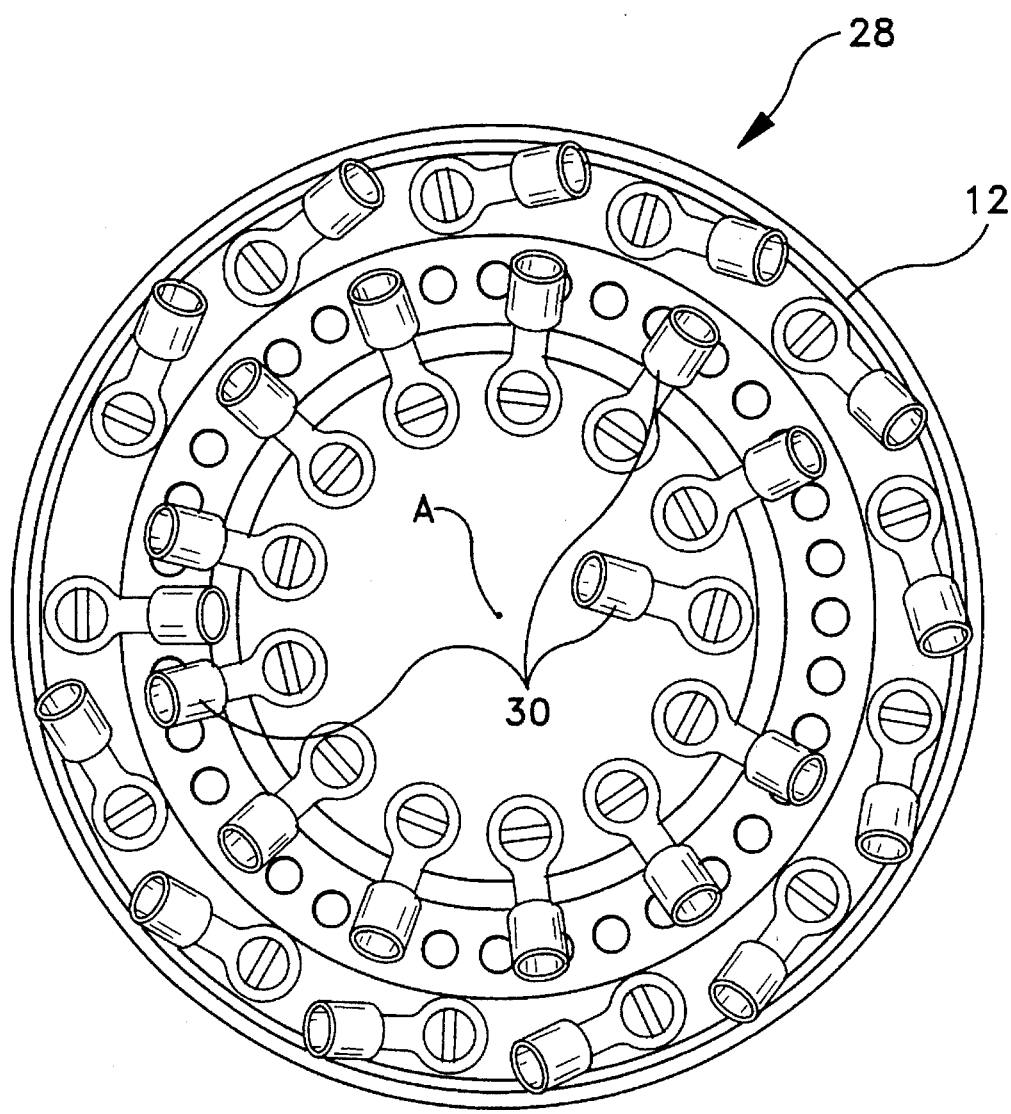
FIG. 3 is a bottom view of the interior of the base of the spinner head of FIG. 1 showing individual electrical connections thereto.

Referring to FIG. 3, a portion of the electrical interface assembly 28 of the present invention is shown. Electrical interface assembly 28 includes a plurality of electrical terminals 30 which provide for the termination of individual electrical wires (not shown). Each electrical terminal 30 is individually connected to a resistance heating device 31 (FIG. 2) contained in an individual one of tubular heating elements 20. The resistance heating device 31 may include induction windings passed through the interior of the tubes. The frequency or voltage potential of the windings are controlled in a manner known in the art to provide and maintain the desired temperature on the outside of the tube. Also, in a manner well known in the art, electrical power is supplied by electrical wires through terminals 30 to the tubular heating elements 20. Such power provides for the heating of the resistance heating device 31 within tubular heating elements 20. Tubular heating elements 20 may be hand-wired for single or multiple phase operation under alternating current of sufficient frequency and voltage.

Individually powering each of the tubular heating elements 20 in a manner described herein permits each tubular heating element 20 to be heated to a precisely controlled temperature. That temperature is uniform as between the multiplicity of tubular heating elements 20 forming the circular array 20a between base 12 and cover 16. As a result of the above-described construction, a high power spinner head design is achieved. The spinner head 10 may therefor be constructed of smaller size than spinner heads currently used and can achieve output rates, due in part to the individual uniform heating of tubular heating elements 20, not previously achievable in spinner heads of such a size. While in the preferred embodiment each tubular heating elements 20 forming array 20a is individually powered, it is also contemplated that only selective ones of said tubular heating elements 20 may be powered for specific purposes.

As particularly shown in FIGS. 4 and 5 it is desirable to precisely control the spacing between adjacent tubular heating elements 20. It has been found desirable to limit the spacing between adjacent tubular elements 20 to between preferably 0.002 to 0.020 inches although smaller and larger spaces may be provided. The construction and arrangement of tubular heating elements 20 permits the tight uniform control of the spacing. In combination with uniform heating, uniform spacing is required to produce a spun product having uniform morphology. In the example shown in FIG. 4, tubular heating elements 20 are spaced apart a distance preferably about 0.020 inches. This spacing will result in spun product having the uniform morphology of a given type depending upon other processing parameters.

The operation of the embodiment shown in FIGS. 1–5 may now be described. A feedstock material such as sugar or sugar mixed with other materials, may be introduced into chamber 25 of spinner head 10 through funnel 22. Spinner head 10 is caused to rotate at a selected speed about the axis A by stem 26. The material within spinner head 10 is propelled by centrifugal force directly against the cylindrical wall formed by the circular array 20a of tubular heating elements 20. The tubular heating elements 20, having been uniformly heated to a preselected temperature sufficient to provide proper processing conditions, heat the material projected thereagainst and cause the solid material to be reduced for processing in rapid fashion. The material is then forced through the small openings 21 between tubular heating elements 20 to be propelled into the ambient atmosphere where it is reformed and solidified. Such propulsion causes physical and/or chemical changes in the spun product. The size and shape of the spun product which has reformed as a solid upon exiting the spinner head, depends greatly upon the speed at which the spinner head is rotated, the temperature maintained by the tubular heating elements, the size of the openings through which it is propelled, the path which the material takes through the barrier upon exiting the spinner head as well as the type of material introduced into the spinner head. The present invention contemplates forming different shapes of spun product by regulating many of these factors. By narrowing the spacing between tubular heating elements 20 or by otherwise restricting expulsion of the material out from spinner head 10, in combination with the uniform heat applied by individual tubular heating elements 20, it is contemplated that the shape of the spun product can be changed.

Figure 5A:
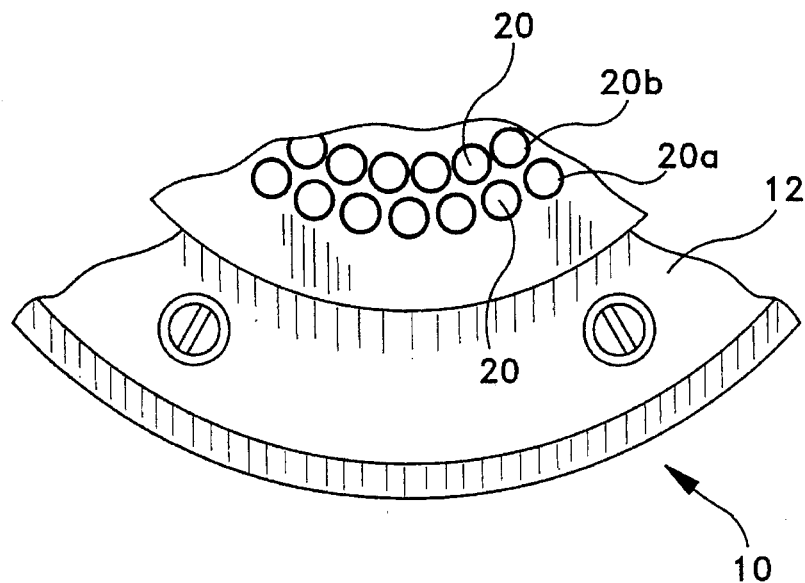
FIG. 5A is a view similar to that shown in FIG. 5 showing a further embodiment of the spinner head of the present invention.

Referring to FIG. 5A, a further arrangement of tubular heating elements 20 are shown. It is contemplated that tubular heating elements 20 may be arranged in plural circular arrays. As shown in FIG. 5A, a second circular array 20b is designed co-axial with first circular array 20a. In preferred form, each tubular heating element 20 of array 20b is offset from the tubular heating element 20 of array 20a. This establishes a tortuous path through which the spun product must pass before being expelled from spinner head 10. While two concentric arrays of tubular heating elements 20 are shown, other arrangements and numbers of arrays are also within the contemplation of the present invention. The tubular heating elements 20 may, for example, be arranged in an inwardly spiraling pattern.

Figure 6:
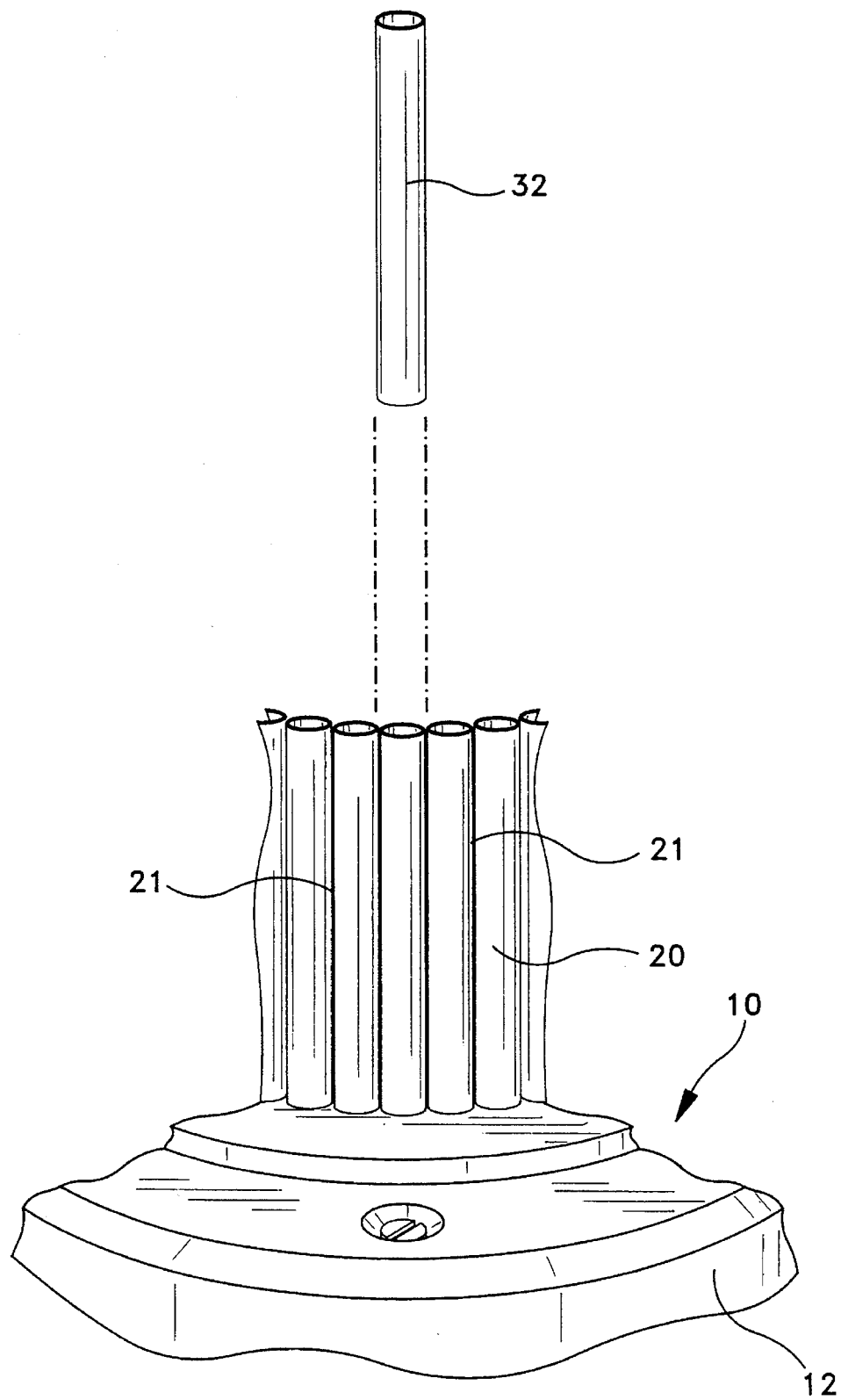
FIGS. 6–8 show in partial perspective view, the spinner head of FIG. 1 used in combination with various structures interposed in the spaces between the tubular heating elements.

Referring now to FIG. 6, one technique to change the opening size through which the feedstock material is expelled is to employ tubular sleeves 32 over one or more of the tubular heating elements 20. Tubular sleeves 32 are elongate hollow cylindrical members formed of a suitable heat conductive metal. The size and shape of tubular sleeves 32 may be precisely controlled so that the spacing between adjacent sleeves 32 positioned over adjacent tubular heating elements 20 defines a precisely controlled opening. The opening defined between adjacent tubular sleeves 32 is defined by the adjacent tangent points thereof in a manner similar to that described above with respect to the embodiments shown in FIGS. 1–5. As the tubular sleeves 32 are formed of a heat conductive material, heat generated by tubular heating elements 20 is uniformly thermally conducted to tubular sleeves 32. In the embodiment shown in FIG. 6, tubular sleeves 32 are constructed to form a spacing between adjacent sleeves which is about 0.002 inches. Such small precisely defined openings have been heretofore unachieveable in prior art devices using heating elements to define the openings through which feedstock material is expelled. It is difficult to control the tolerances on such heating elements to such an extent as to obtain such precise spacing. However, it has been found that the tolerances may be controlled in the formation of tubular sleeves 32 so that the spacing between adjacent tubular sleeves may be so controlled.

Processing feedstock in the embodiments shown in FIGS. 1–6 where openings 21 are defined by adjacent cylindrical structures such as tubular heating elements 20, or tubular heating elements 20 having sleeves 32 thereover, has, with proper control of conditions, resulted in spherical product which is defined in above-incorporated copending commonly owned application bearing Ser. No. 08/330,412. Spherical formation has been achieved where the spacing between tubular heating elements 20 is sufficiently small. Spherical formation is especially facilitated by use of sleeves 32. The construction of spinner head 10 minimizes surface contact between the material and the heating surface as the product is spun therefrom. There is no "cooling" surface which comes in contact with the spun product as it reforms upon being expelled from spinner head 10. The hot molten product therefor tends to tear off of the tubular heating elements 20 and reforms as a spherical pearl or bead in the atmosphere due to surface tension.

While preferably the molten product is allowed to reform in ambient atmosphere as it exits spinner head 20, the present invention further contemplates applying a stream of air to the material as it emerges from spinner head 10. The stream of air may be heated or cooled to an appropriate temperature. The stream of air may be applied either counter to or in the direction of travel of the spinner head. The stream of air which may be applied with conventional air jets, imparts differing characteristics to the reformed product.

Figure 7:
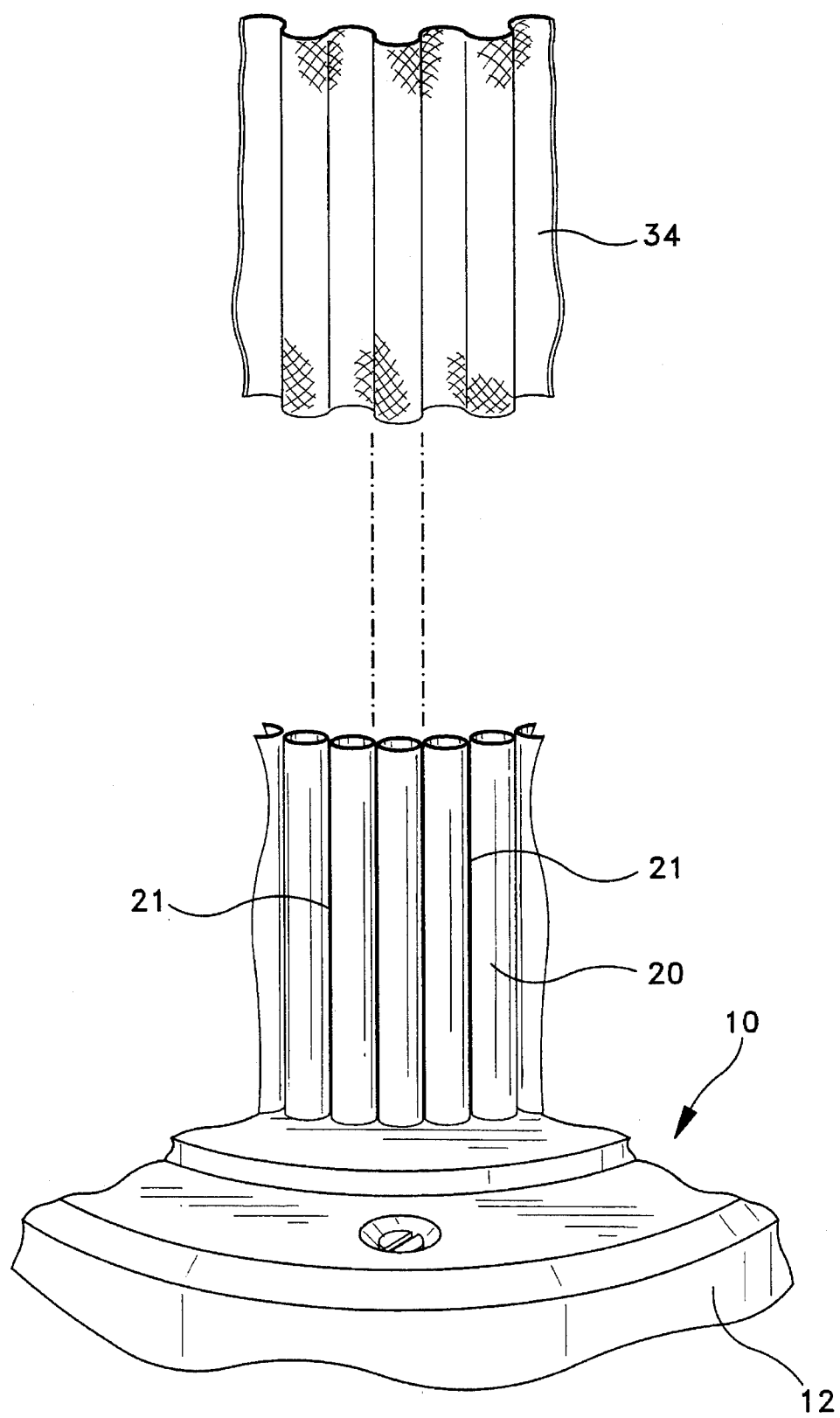

Another technique for retarding or restricting the expulsion of feedstock material through openings defined between tubular heating elements 20 is shown in FIG. 7. The embodiment shown in FIG. 7 employs an elongate web 34 of screening material. Web 34 is preferably a metallic woven screen of between 30–120 mesh having fine holes or perforations therethrough. In preferred form, a strip of such screening material of about 60 mesh, having a transverse extent generally co-extensive with the length of tubular heating elements 20 is interposed between tubular heating elements 20 in a serpentine fashion. The web 34 thus takes on an undulated shape by traversing in and out of adjacent openings 21. As may be expected, the rotation of spinner head 10 forces feedstock material against and through screening web 34. As the web 34 is formed of metal and is in engagement with tubular heating elements 20, the web 34 itself will rise to an elevated temperature.

Figure 8:
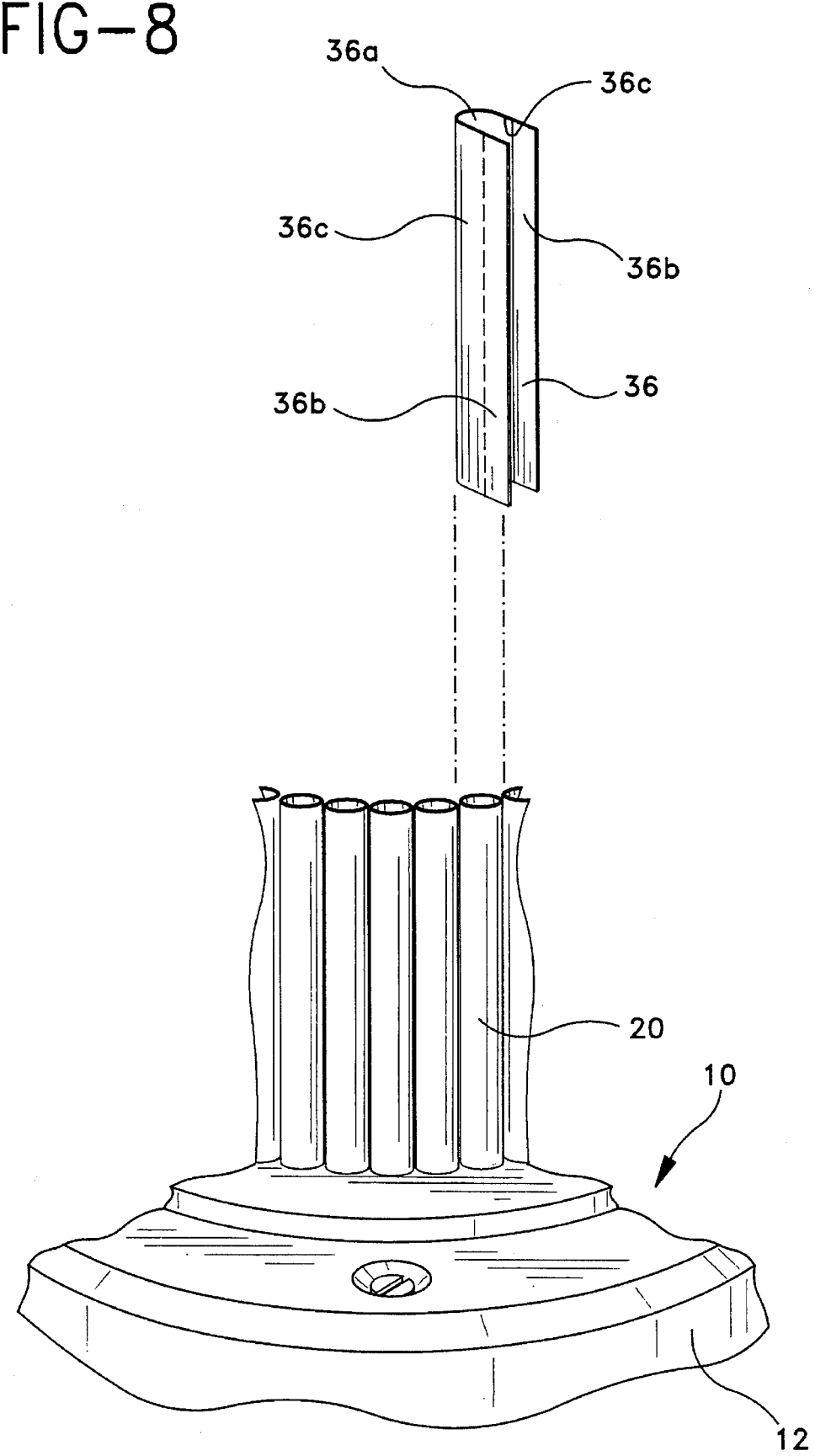

A still further technique for reducing the size of the openings between adjacent tubular heating elements 20 is shown in FIG. 8. The embodiment of FIG. 8 employs an open-ended vane or fin 36 positionable about each tubular heating element 20. Fin 36 is an elongate member formed of heat conductive metal. Fin 36 is generally U-shaped in cross-section having a curved inwardly directed face 36a and a pair of opposed generally parallel outwardly extending arms 36b. Fins 36 are place about tubular heating elements 20 so that inwardly directed face 36a is positioned interiorly of chamber 25 (FIG. 2) and opposed parallel arms 36b extend outwardly of chamber 25. Fins 36 serve to reduce the opening or spacing between adjacent tubular heating elements 20. Further, the shape of fins 36, particularly outwardly extending arms 36b, have been found to provide a floss under appropriate conditions. As the feedstock is expelled from spinner head 10, the product is caused to engage and track along outwardly extending arms 36b as it cools and reforms. As with the embodiment shown in Figure 6, the fins 36 may be precisely constructed so as to accurately control the spacing therebetween. It is preferred that a spacing of about between 0.0050 and 0.0070 inches may be provided between adjacent fins 36.

While arms 36b are shown as being elongate and outwardly extending from chamber 25 in preferred construction, the present invention contemplates forming fins 36 to have truncated arms 36c (shown by dashed lines in FIG. 8). The truncated arms 36c would not extend outwardly of chamber 25. As this eliminates the extending cooling surfaces formed by arms 36b, a different product morphology may be formed with this embodiment.

Figure 9:
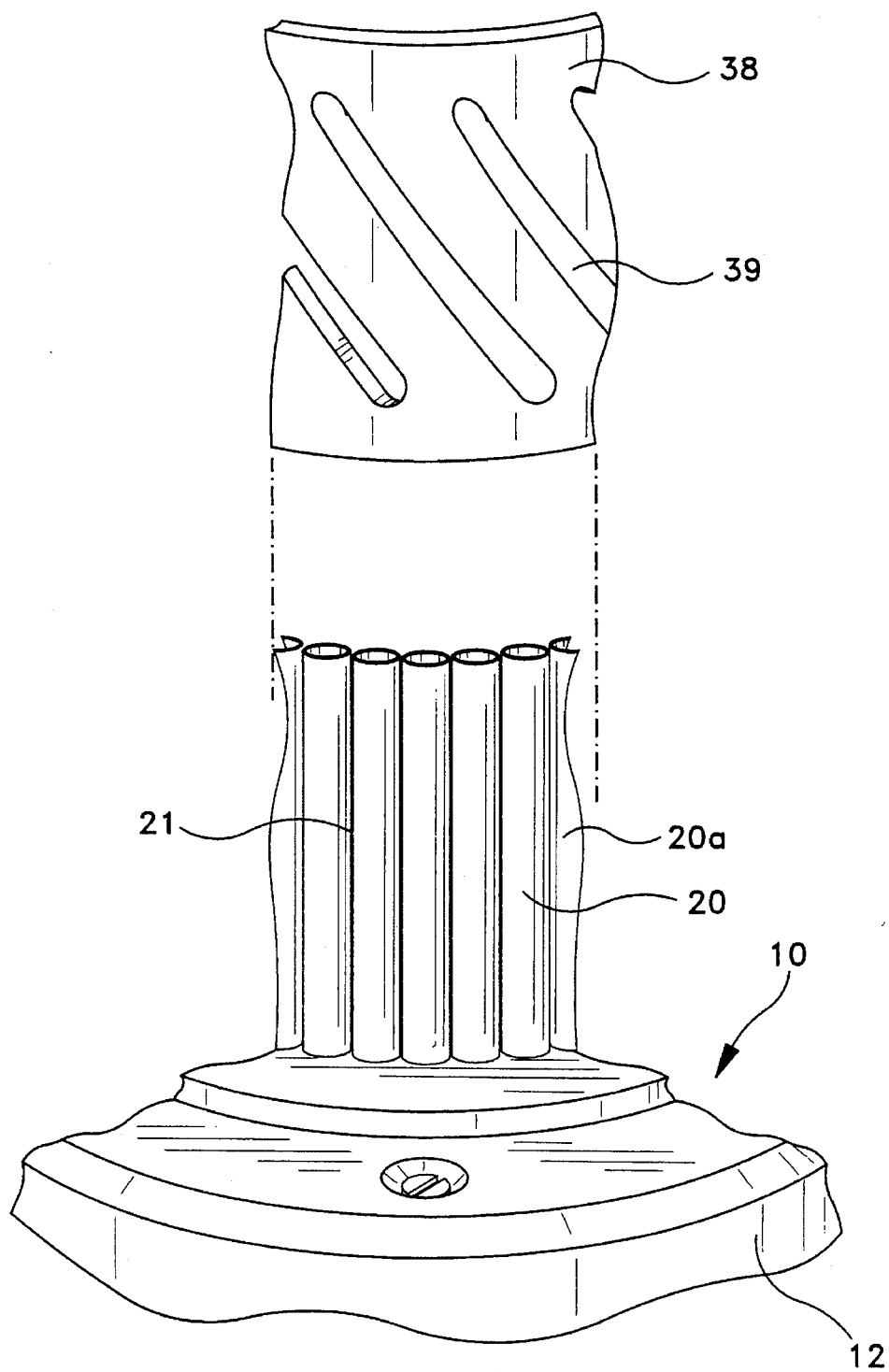
FIG. 9 shows in partial perspective, the spinner head of FIG. 1 used in combination with an annular shell placed in circumscribing relation about the tubular heating elements.

A further technique for restricting or retarding the expulsion of feedstock material from spinner head 10 is shown in FIG. 9. Spinner head 10 includes an outer cylindrical shell 38 which may be positioned in circumscribing relationship exteriorly of the circular array 20a of tubular heating elements 20. Shell 38 may be of construction similar to those well known in the spinner head art. Shell 38 is preferably constructed of a heat conductive metal and includes a pattern of openings 39 therethrough, one particular pattern being shown in FIG. 9. In addition to the feedstock material being forced through the openings 21 between tubular heating elements 20, the feedstock material is further spun through openings 40 in shell 38.

Referring now to FIGS. 10 and 11, a still further embodiment of the spinner head 10 is shown. Spinner head 10 is modified so as to include a smaller number of tubular heating elements 20. The tubular heating elements 20 are arranged in a circular array 20a similar to that shown in previous embodiments, however the spacing between adjacent tubular elements 20 has been increased. This may be accomplished by forming spinner head 10 to have the tubular heating elements 20 so positioned, or the spinner head 10 shown in previous embodiments may be modified so as to remove alternating ones of tubular heating elements 20. In either case, the spacing between tubular heating elements 20 shown in FIG. 10 is greatly increased over that shown in the previous embodiments.

In order to narrow the openings through which the feedstock material is expelled, the present embodiment employs an annular housing assembly 40. Annular housing assembly 40 includes an annular housing 42 formed of heat conductive metal. Annular housing 42 includes an upstanding annular wall 44 having a plurality of longitudinal cylindrical passages 46 extending between opposed upper and lower wall surfaces 44a and 44b. The size and location of cylindrical passages 46 are arranged in annular wall 44 to correspond to the size and location of tubular heating elements 20. Annular housing 42 is designed to fit over the array 20a of tubular heating elements 20 shown in FIG. 10, with the individual tubular heating elements 20 being resident within passages 46. Chamber 25 which accommodates feedstock material is now defined by the inner cylindrical wall 42a of housing 42. In order to permit expulsion of feedstock material from spinner head 10, the wall 44 of annular housing 42 includes a plurality of longitudinal radially-directed slots 48 therethrough. Slots 48 extend through wall 44 between upper surface 44a and lower surface 44b. Slots 48 are in communication with chamber 25 within spinner head 10 and with the exterior of spinner head 10 to permit expulsion of feedstock material therethrough.

Slots 48 are defined by opposed surfaces 48a and 48b which extend between the inner diameter and outer diameter of wall 44. As housing 42 is formed of a heat conductive material, the heating of tubular heating elements 20 will cause the heating of housing 42 so as to process the feedstock material within chamber 25. The processed feedstock material is expelled through slots 48 between opposed walls 48a and 48b. The material is in contact with opposed walls 48a and 48b as it is spun from spinner head 10. Under appropriate conditions the product tends to be floss-like.

In order to further affect the morphology of the spun product exiting spinner head 10, annular housing assembly 40 may include a combination of one or more annular rings or plates 50. Plates 50 shown in FIGS. 10 and 11 include generally washer-like flat annular plates 50a alternated in stacked arrangement with rimmed plates 50b.

As more clearly shown in FIG. 11, plates 50a are dimensioned to fit in exterior circumscribing relation around annular housing 42. Interleaved with plates 50a are rimmed plates 50b which as shown in FIG. 11, have a generally T-shaped cross-section. Appropriate securement hardware (not shown) may be used to support plates 50a and 50b in stacked arrangement about annular housing 42. Upon exiting slots 48 (FIG. 10), the feedstock material becomes more viscous in the spaces between plates 50a and 50b. As the plates 50 are spaced from tubular heating element 20, they tend to be cooler. The T-shaped rim of plates 50b provides a non-linear path for travel of the spun product. The product must traverse a tortuous path as it exits spinner head 10 and reforms. This facilitates production of a floss-like spun product.

While annular housing assembly 40 is shown to include both annular housing 42 and stacked plates 50, it is contemplated that annular housing 42 and stacked plates 50 may be used independently of each other where desired.

It is further contemplated that other configurations of stacked annular plates 50 may be employed. Referring to FIGS. 11A and 11B, annual housing assembly 40 may include a combination of one or more differently configured annular rings or plates 51. The array of plates 51 generally includes a first set of larger annular plates 51a alternated in stacked arrangement with a second set of smaller annular plates 51b. As shown particularly in FIG. 11A, annular plates 51a are dimensioned to fit in exterior circumscribing relation around annular housing 42. Annular plates 51a are generally flat plate-like members having opposed radially directed diverging upper and lower wall surfaces 53 so as to form between two stacked plates 51a a tapered passage 55. In order to maintain stacked plates 51a in spaced relationship plates 51a are interleaved with smaller annular plates 51b. Appropriate securement hardware such as bolts 17b may be used to support plates 51a and 51b in stacked arrangement around annular housing 42.

Referring more particularly to FIG. 11B, the interleaving of larger annular plates 51a with smaller annular plates 51b is shown. Each of plates 51a and 51b includes a radially inwardly positioned depending ridge 57a and 57b respectively. The respective ridges overlie one another to define therebetween an open tortuous path 59 between each plate 51a and 51b. The particular configuration of tortuous path 59 is provided so as to prevent unprocessed materials from passing therethrough and being expelled from spinner head 10. Thus, only processed material enters tapered passage 55 defined between larger annular plates 51a.

As processed material passes through path 59 it is cooled and is formed along the opposed diverging surfaces 53 defining passage 55. The cooling of the processed material along the longitudinal surfaces 53 also facilitates the formation of floss-like spun product under certain processing parameters. It has been found that the particular embodiments shown in FIGS. 11A and 11B facilitates such floss production while minimizing or eliminating bead formation.

The use of annular housing assembly 40 is particularly beneficial in the manufacture of spun pharmaceutical product. In many of the embodiments described herein, the feedstock material comes in direct contact with heated tubular heating elements 20. In order to clean spinner head 10 to process additional materials, the entire head including tubular heating elements 20 must be cleaned. In the embodiment shown in FIGS. 10 and 11, annular housing assembly 40 constitutes the components which come in contact with the pharmaceutical material. These components may be easily removed from spinner head 10 for cleaning and reassembly. Also, different housings having different sized slots may be interchangeably employed, depending upon various processing parameters.

Referring now to FIGS. 12 and 13, a further modification of spinner head 10 of the present invention is contemplated. As above described, each of tubular heating elements 20 are individually heated so as to provide uniform controllable heat within chamber 25 of spinner head 10. However, despite such uniform heat, as tubular heating elements 20 are supported between base 12 and cover 16, which are primarily formed of metal, base 12 and cover 16 can act as heat sinks dissipating some of the heat generated by tubular heating elements 20. This is especially prevalent at the area of contact between tubular heating elements 20 and base 12 and cover 16. At these locations cold spots may exist where feedstock material contacting these spots may not be fully processed. This could result in residual particles being expelled from spinner head 10 thereby reducing the efficiency of spinner head 10. Further, under appropriate conditions, it has been found that there is more of a tendency to produce floss-like product near the outer extents of tubular heating elements 20 and spherical products (beads) at the central extent. In order to assure that material is passed through openings 21 between individual heating elements 20 only at locations where there is sufficient heat to fully process the feedstock material so as to produce beads rather than floss, spinner head 10 employs a pair of spaced apart insulating discs 60.

Insulating discs 60 are generally annular having a gear-like outer wall surface 62. Undulated portion 62a of the gear-like outer surface 62 corresponds in shape to the inner circular pattern formed by tubular heating elements 20. Each insulating disc has a first surface 64 which is generally planar and an opposed second surface 66 which tapers inwardly towards the center of disc 60. In use, one disc 60 is positioned within chamber 25 against bottom insulating ring 14. Disc 60 is positioned so that planar surface 64 lies against bottom insulating ring 14 and opposed tapered surface 66 faces inwardly towards chamber 25. In a like manner, another insulating disc 60 is positioned adjacent top insulating ring 18 with planar surface 64 being placed thereagainst are opposed tapered surface 66 facing inwardly toward chamber 25. In the preferred embodiment insulating discs 60 are formed of a non-stick polymer such as polytetrafluoroethylene (PTFE).

In use, insulating discs 60 provide two functions. The position of the insulating rings adjacent the juncture of tubular heating elements 20 and their respective engagement with base 12 and cover 16 prevents unprocessed material from being spun through the openings between tubular heating elements 20 by blocking the cold spots preventing such passage. Also the tapered non-stick surfaces 66 of discs 60 serve to direct unprocessed material towards the hotter central extents of tubular heating elements 20 thereby assuring that only processed product will be expelled from the openings between tubular heating elements 20.

A still further embodiment of the spinner head of the present invention is shown in FIG. 14. Spinner head 10' shown therein is similar to spinner head 10 described above. Corresponding references numerals will be used to denote similar components. Spinner head 10' includes a base 12' and a cover 16' spaced above base 12'. Cover 16' includes a central opening having a funnel-type structure 18' therein to permit entry of feedstock material into a chamber 25' defined between cover 16 and base 12. Interposed between base 12' and cover 16' is an intermediate annular plate 15'. Intermediate annular plate 15' is supported between base 12' and cover 16' by appropriate mounting hardware 17'.

In the present illustrative embodiment, a stacked set of circumferentially arranged tubular heating elements 20' are provided. A first array 20c' of tubular heating elements 20' extend between cover 16' and intermediate member 15' while a second array 20d' of tubular heating elements 20' extend between intermediate member 15' and base 12'. Each of the tubular heating elements 20' of both arrays may be individually heated so as to provide uniform controlled heat to spinner head 10'. While a pair of stacked arrays 20c' and 20d' of tubular heating elements 20' are shown, it is contemplated that a single array having heating elements which extend between cover 16' and base 12' through intermediate plate 15' may also be employed. As may be appreciated, the construction of spinner head 10' provides a larger chamber 25' in which feedstock material may be processed and spun. In combination with the uniform heat provided by the individual heating of the heating elements 20' increased product output is achieved by the construction shown in FIG. 14.

Referring to FIGS. 15 and 16, a further modification of spinner head 10, particularly useful with pharmaceutical product, as described above, is shown. Spinner head 10 is similarly modified in a manner shown in FIGS. 10 and 11 to include a smaller number of tubular heating elements 20. In order to narrow the opening through which feedstock material is expelled, the present embodiment employs individual modular blocks 70 over tubular heating elements 20.

Each modular block 70 includes a metallic heat conductive body having a central cylindrical passage 72 therethrough which is constructed and arranged to accommodate an individual tubular heating element 20. Modular block 70 has a generally trapezoidal cross-section, having a smaller wall 74 which faces inwardly toward chamber 25 and an opposed wider outer wall 76. In preferred form outer wall 76 may include an angular surface 78, which provides for longer opposed sidewalls 80 and 82 without overly increasing the mass of modular blocks 70. The modular blocks 70 may be slipped over tubular heating elements 20. As shown in FIG. 16, walls 80 and 82 form radially-directed slots 84 between adjacent modular blocks 70 through which feedstock material may be processed and expelled in a manner similar to that of slots 48 of the embodiment shown in FIGS. 10 and 11. The size of slots 84 between blocks 70 may be controlled to alter the size of the passage through which feedstock material is expelled.

As shown in FIG. 16, blocks 70 may be rotated about tubular heating elements 20 (arrows B) to cant or twist the blocks, thereby changing the spacing and/or direction of slots 84. The rotation of blocks 70 may be accomplished individually or may be done in unison with an appropriate mechanism (not shown). With such a mechanism, modular blocks 70 may move in a manner similar to an iris diaphragm of a camera to increase/decrease the size of the passage defined by slots 84.

A further construction of block 70 is shown in FIG. 17, where transverse slots are formed. Modular block 90 may include a body formed to have a series of vertically spaced horizontally extending fins 92. Modular block 90 may be constructed so that one set of fins 92a interleave with an adjacent set of fins 92b of an adjacent modular block 90. In this manner a series of vertically spaced transverse slots 94 are formed through which feedstock material may be processed.

As described above, as the components (modular blocks 70) which contact the feedstock material during processing may be easily removed, the embodiment shown in FIGS. 15–17 may be advantageously employed with pharmaceutical product.

Referring now to FIG. 18, a still further embodiment of the spinner head of the present invention is shown. Spinner head 95 of the present invention includes generally circumferential array 95a of horizontally disposed tubular heating elements 96. A set of vertically spaced horizontally extending heating elements 96 may be positioned between an adjacent pair of vertically extending support elements 97. Each of support elements 97 may be positioned and spaced in circumferential fashion about base 95b. Appropriately configured retaining openings 95c are provided to accommodate support elements 97. While not shown in FIG. 18, a cover may be positioned over array 95a to enclose spinner head 95 so as to form a chamber 97 therein.

Horizontally disposed tubular heating elements 96 may be of similar construction to tubular heating elements 20 described above. All or selected ones of tubular heating elements 92 may be individually powered in accordance with the present invention. It is also contemplated that vertical supports elements 97 in addition to supporting horizontally extending tubular heating elements 96 may also provide a common power bus to energize the individual tubular heating elements. Vertical support elements 97 include appropriate openings spaced therealong which accommodate the ends of tubular heating elements 96 therein in an interference fit such that securement between the tubular heating elements 96 and the vertical support elements 97 is achieved under both ambient and running temperatures. The spaces between adjacent horizontally disposed tubular heating elements 96 can be adjusted to vary the openings through which feedstock material is processed.

It is further contemplated that tubular heating elements of uniform size and configuration or of differing size and configuration may be employed within the same spinner head. An arrangement of the same or different sized tubular heating elements allows the spinner head to be statically and/or dynamically balanced. As described above with respect to the spinner head having vertically disposed tubular heating elements, horizontally positioned tubular heating elements 96 of the present embodiment may be canted or skewed with respect to the support elements 97.

Furthermore, FIG. 18 shows one circumferential arrangement of array 95a. Other arrangements are also within the contemplation of the present invention. Further, plural concentric sets of arrays of horizontally disposed tubular heating elements are also within the contemplation of the present invention.

The embodiment shown in FIG. 18 also has particular utility with pharmaceutical products as the individual tubular heating elements 96 supported between a common bus such as vertical support element 97 may be easily removed for cleaning as is necessary in the processing of pharmaceutical products.

Various changes to the foregoing described and shown structures would now be evident to those skilled in the art. Accordingly, the particularly disclosed scope of the invention is set forth in the following claims.

What is claimed is:

1. A spinner head comprising:

a base;

a cover aligned with and spaced from said base;

a plurality of discrete elongate spaced apart heating elements positioned between said base and said cover and defining a perimetrical configuration;

said base, said cover and said heating elements mutually defining a chamber for accommodating therein a solid non-solubilized feedstock material capable of undergoing intraparticle flow with the application of heat and force;

heating means for individually heating selected ones of said discrete heating elements to an elevated temperature sufficient to cause processing of said feedstock material; and means for rotating said chamber about an axis of rotation to cause said feedstock material to be propelled towards said heating elements and to be expelled from between said spaced heating elements.

2. A spinner head of claim 1 wherein said heating elements are generally of tubular configuration.

3. A spinner head of claim 2 wherein said heating elements extend longitudinally between said base and said cover in spaced side-by-side relation.

4. A spinner head of claim 3 wherein said base and said cover are generally planar and circular and wherein said tubular heating elements are arranged in a circumferential configuration about said base and said cover a given radial distance from said axis of rotation.

5. A spinner head of claim 4 wherein said tubular heating elements are arranged in plural circumferential configurations about said axis of rotation.

6. A spinner head of claim 5 wherein one of said plural configurations is co-axial with and radially spaced from another of said plural configurations.

7. A spinner head of claim 4 further including:

an intermediate generally circular planar member positioned between said base and said cover, one of said plural circumferential configurations of said tubular heating elements extending between said base and said intermediate planar member and another of said circumferential configurations of said tubular heating elements extending between said intermediate planar member and said cover.

8. A spinner head of claim 3 wherein said heating means includes individual heating devices disposed within said heating elements.

9. A spinner head of claim 8 wherein each said heating device includes an electrical resistance heater.

10. A spinner head of claim 4 wherein said cover includes a cover opening in communication with said chamber for insertable accommodation of said feedstock material.

11. A spinner head of claim 4 wherein said planar cover and said planar base are formed of heat conductive material, thereby forming heat sinks for dissipating heat conducted by said tubular heating elements.

12. A spinner head of claim 11 further including a non-stick heat insulative member positioned within said circumferential configuration of said heating elements adjacent each of said cover and said base.

13. A spinner head of claim 12 wherein said non-stick heat insulative member is formed of polytetraflorethylene.

14. A spinner head of claim 4 further including restriction means for restricting said expulsion of said feedstock material.

15. A spinner head of claim 14 wherein said restriction means includes space-reducing means for reducing the spacing between said spaced heating elements.

16. A spinner head of claim 15 wherein said space-reducing means includes heat conductive elongate sleeves disposed over said heating elements, said heat conductive sleeves providing spaces therebetween which are less than the spaces between said heating elements.

17. A spinner head of claim 16 wherein said spacing between adjacent said heating elements is about 0.020 inches.

18. A spinner head of claim 17 wherein said spacing between adjacent said heat conductive sleeves is about 0.002 inches.

19. A spinner head of claim 14 wherein said restriction means includes a web of screen material interposed between said spaced heating elements, whereby said feedstock material is expelled through said screen material.

20. A spinner head of claim 19 wherein said web of screen material is an elongate strip, said strip being positioned in a continuous serpentine pattern between said heating elements.

21. A spinner head of claim 20 wherein said screen material is formed of heat conductive material.

22. A spinner head of claim 15 wherein said space-reducing means includes elongate heat conductive fins disposed about said heating elements, said fins having a generally U-shaped cross-section with a curved central portion and a pair of spaced-apart generally parallel wall portions extending therefrom.

23. A spinner head of claim 22 wherein said fin wall portions are directed radially outwardly.

24. A spinner head of claim 14 wherein said restriction means includes:

a cylindrical shell having a cylindrical wall outwardly circumscribing said circumferential configuration of said tubular heating elements, said cylindrical wall having a plurality of openings therethrough so as to permit restricted passage of said feedstock material expelled from said chamber.

25. A spinner head of claim 24 wherein said cylindrical wall extends between said planar cover and said planar base.

26. A spinner head of claim 14 wherein said restriction means includes:

an annular plate having a generally annular wall outwardly circumscribing said circumferential configuration of said tubular heating elements, said annular wall having a radially extending planar portion generally parallel to said planar cover and said planar base and a transverse end wall generally perpendicular to said planar portion, said annular plate being constructed and arranged to cause said expelled feedstock material to engage said transverse wall.

27. A spinner head of claim 14 wherein said restriction means includes:

a plurality of spaced apart stacked annular plates circumscribing said circumferential configuration of said tubular heating elements, said plurality of annular plates defining spaces therebetween permitting restricted passage of said feedstock material expelled from said chamber.

28. A spinner head of claim 27 wherein selected ones of said spaced apart plates include an annular planar portion having opposed radially outwardly diverging surfaces.

29. A spinner head of claim 27 wherein selected ones of said spaced apart plates define a tortuous path between adjacent plates so as to restrict unprocessed said feedstock material from passing therebetween.

30. A spinner head of claim 27 wherein selected ones of said spaced apart plates includes a flat annual planar portion generally parallel to said planar cover and said planar base and a transverse end wall, said transverse end wall extending above and below said planar portion, said transverse end wall of one planar plate being spaced from said transverse end wall of an adjacent plate so as to define a tortuous passage between said plates.

31. A spinner head of claim 14 wherein said restriction means includes:
an elongate generally annular housing having plural circumferentially spaced cylindrical passages extending therethrough, said housing being positionable over said tubular heating elements with said tubular heating elements residing within said passages, said annular housing defining longitudinal radially-directed slots between said cylindrical passages so as to permit passage of said feedstock material therethrough.

32. A spinner head of claim 31 wherein said annular housing is formed of heat conductive material.

33. A spinner head of claim 32 wherein said slots are defined by closely spaced slot walls extending between the inner and outer diameter of said annular housing.

34. A spinner head of claim 2 wherein said heating elements are arranged in vertically spaced generally horizontally extending relation.

35. A spinner head of claim 34 wherein said spinner head further includes a plurality of perimetrically spaced elongate vertical support elements extending longitudinally between said base and said cover and wherein said horizontally extending heating elements extend between said elongate vertical support elements.

36. A spinner head of claim 35 wherein each said vertical support element includes:
an individual electrical resistance heating bus for supplying heat to said heating elements supported thereby.

37. A spinner head of claim 36 wherein said spaced horizontally extending heating elements define passages to permit passage of said feedstock material therethrough.

38. A spinning machine comprising:
a spinner head having a chamber for receipt of feedstock material;
a plurality of discrete heating elements forming a boundary of said chamber, said heating elements defining spaces between adjacent elements;
means for individually heating selective ones of said heating elements to a temperature sufficient to cause said feedstock material to become processed; and
means for spinning said spinning head to cause expulsion of said feedstock material from said chamber through said spaces between said heating elements.

39. A spinning machine of claim 38 wherein said heating means further includes an electrical resistance heater in association with selective ones of said heating elements.

40. A spinning machine of claim 38 wherein said heating elements include elongate tubular members formed of heat-conductive material, said tubular members being arranged in a side-by-side closely spaced pattern.

41. A spinning machine of claim 40 wherein said heating means includes individual electrical resistance heaters associated with said selective ones of said tubular members.

42. A spinning machine of claim 40 wherein said selective ones of said tubular members include all of said tubular members.

43. A spinning machine of claim 40 wherein said selective ones of said the tubular members includes less than all of said tubular members.

44. A spinning machine of claim 38 wherein each space between said adjacent heating elements is about 0.020 inches.

45. A spinning machine of claim 44 further includes a web of screen material interposed between said heating elements wherein said spinning means causes expulsion of said feedstock material through said screen.

46. A spinning machine of claim 44 wherein said heating elements include element covers thereover for reducing said spaces between said adjacent heating elements to about 0.002 inches.

47. A spinning machine of claim 46 wherein said covers include tubular sleeves positioned over said heating elements.

48. A spinning machine of claim 46 wherein said covers include elongate generally U-shaped members surrounding said heating elements.

49. A method of processing feedstock material comprising the steps of:
providing a spinner head having a chamber including a cylindrical wall defined by a plurality of elongate discrete heating elements arranged in spaced apart relationship;
introducing said feedstock material into said chamber;
individually heating selective ones of said heating elements to an elevated temperature sufficient to cause processing of said feedstock material; and
spinning said spinner head to propel said feedstock material towards said discrete heating elements to process said feedstock material and to expel feedstock material from between said heating elements.

50. A method of claim 49 wherein said step of individually heating said heating elements includes:
providing plural discrete electrical resistance heaters; and
placing one of said plural resistance heaters in association with an individual one of said selective ones of said heating elements.

51. A method of claim 50 wherein said placing step further includes:
placing one of said plural resistance heaters in association with each of said heating elements.

52. A method of claim 49 further including the step of restricting said expulsion of said feedstock material from between said heating elements.

53. A method of claim 52 wherein said restricting step further includes:
providing a longitudinal web of screening material; and
interposing said web of screening material between said heating elements wherein said feedstock material is expelled through said web of screening material.

54. A method of claim 52 wherein said restricting step further includes:
providing a plurality of elongate heat conductive sleeves; and
disposing said heat conductive sleeves over said heating elements.

55. A method of claim 53 wherein said restricting step further includes:
providing a plurality of heat conductive fins, said fins being elongate and having a generally U-shaped cross-section; and disposing said heat conductive fins about said heating elements.

56. A method of claim 49 further including the steps of:

providing an annular housing having plural circumferentially spaced cylindrical passages extending therethrough and longitudinal radially directed slots between said passages; and positioning said annular housing over said heating elements with said heating elements residing within said passages.

57. A method of claim 49 further including the steps of:

providing a plurality of annular plates; and stacking said annular plates in spaced apart fashion in circumscribing relation about said heating elements.

* * * * *